(12) United States Patent
Briggs

(10) Patent No.: US 12,288,182 B2
(45) Date of Patent: Apr. 29, 2025

(54) LOCATION-BASED TRANSPORTATION NETWORK

(71) Applicant: CarsArrive Network, Inc., Mesa, AZ (US)

(72) Inventor: Michael Briggs, Chandler, AZ (US)

(73) Assignee: CarsArrive Network, Inc., Mesa, AZ (US)

( * ) Notice: Subject to any disclaimer, the term of this patent is extended or adjusted under 35 U.S.C. 154(b) by 0 days.

(21) Appl. No.: 18/132,078

(22) Filed: Apr. 7, 2023

(65) Prior Publication Data

US 2023/0245042 A1   Aug. 3, 2023

Related U.S. Application Data

(63) Continuation of application No. 16/537,941, filed on Aug. 12, 2019, now Pat. No. 11,625,670.

(Continued)

(51) Int. Cl.
*G06Q 10/0834* (2023.01)
*G06F 3/04817* (2022.01)
(Continued)

(52) U.S. Cl.
CPC ..... *G06Q 10/0834* (2013.01); *G06F 3/04817* (2013.01); *G06F 9/451* (2018.02);
(Continued)

(58) Field of Classification Search
CPC ........... G06Q 10/0834; G06Q 10/0832; G06Q 10/08345; G06Q 10/0835
See application file for complete search history.

(56) References Cited

U.S. PATENT DOCUMENTS 9,542,687 B2 * 1/2017 Carlson ............. G06Q 30/0224
2001/0047284 A1 11/2001 Blalock
(Continued)

OTHER PUBLICATIONS

Technology reinvents cell phone advertising. (Aug. 20, 2007). Bucks County Courier Times Retrieved from https://dialog.proquest.com/professional/docview/392363109?accountid=131444 (Year: 2007).*

(Continued)

*Primary Examiner* — Ibrahim N El-Bathy
(74) *Attorney, Agent, or Firm* — Lempia Summerfield Katz LLC

(57) ABSTRACT

A location-based transportation network for a transportation process is disclosed. The transportation process may be divided into the following stages: identification, communication, agreement, shipment, and payment. With identification, one party to the transport of the good is identified to the other party (e.g., potential carriers to a shipper, or potential shippers to a carrier). In the second stage, the shipper(s) and carrier(s) communicate with one another in order to discuss terms of the shipment. In a third stage, the shipper and carrier come to an agreement (e.g., price, timing, etc.). In a fourth stage, the carrier picks up and ships the goods. Finally, payment may be arranged between the shipper and the carrier. An index pricing model is configured to facilitate the identification stage. Further, a graphical user interface (GUI) can convey information, output search results, plan a route, facilitate communication between the shipper and carrier, and/or enable agreement between the shipper and carrier.

20 Claims, 18 Drawing Sheets

Related U.S. Application Data

(60) Provisional application No. 62/717,106, filed on Aug. 10, 2018.

(51) Int. Cl.
*G06F 9/451* (2018.01)
*G06F 16/29* (2019.01)
*G06F 16/9537* (2019.01)
*G06Q 10/0832* (2023.01)
*G06Q 10/0835* (2023.01)
*H04L 67/52* (2022.01)

(52) U.S. Cl.
CPC .......... *G06F 16/29* (2019.01); *G06F 16/9537* (2019.01); *G06Q 10/0832* (2013.01); *G06Q 10/08345* (2013.01); *G06Q 10/0835* (2013.01); *H04L 67/52* (2022.05)

(56) References Cited

U.S. PATENT DOCUMENTS

| | | | |
|---|---|---|---|
| 2014/0136025 A1 | 5/2014 | Cooper | |
| 2015/0339624 A1 | 11/2015 | Lozito | |
| 2016/0239800 A1 | 8/2016 | Scharaswak | |
| 2016/0335593 A1* | 11/2016 | Clarke | G06Q 10/0833 |
| 2018/0068269 A1 | 3/2018 | Pillai et al. | |
| 2018/0096300 A1* | 4/2018 | Boye | G06Q 10/067 |
| 2019/0087778 A1 | 3/2019 | Evans, Jr. | |
| 2019/0171798 A1* | 6/2019 | Boghossian | G06Q 50/40 |
| 2019/0304043 A1* | 10/2019 | Nakamura | G08G 1/202 |
| 2019/0347945 A1 | 11/2019 | Mohn | |

OTHER PUBLICATIONS

Final Office Action cited in U.S. Appl. No. 16/537,941; Jun. 6, 2022.
Non-Final Office Action cited in U.S. Appl. No. 16/537,941; Nov. 26, 2021.

* cited by examiner

760

Accept Load

*Driver's Name:

Additional Email (Optional):

Fax (Optional):

*Driver Will Pickup This Load On Or Before

Select Date

*Driver Will Deliver This Load On Or Before

Select Date

*Payment Type:

Select Payment Type

LOCATION-BASED TRANSPORTATION NETWORK

REFERENCE TO RELATED APPLICATIONS

This application is a continuation of U.S. Utility application Ser. No. 16/537,941 (now U.S. Pat. No. 11,625,670), which claims the benefit of U.S. Provisional Application Ser. No. 62/717,106 (filed on Aug. 10, 2018), the entirety of U.S. Utility application Ser. No. 16/537,941 (now U.S. Pat. No. 11,625,670) and U.S. Provisional Application Ser. No. 62/717,106 are incorporated by reference herein.

BACKGROUND

Typically, shippers and carriers communicate with one another to schedule the pickup and delivery of goods. However, inefficiencies result leading to the transportation of goods being an expensive undertaking.

DESCRIPTION OF THE FIGURES

FIGS. 7A-D illustrates exemplary user interfaces for inputting search criteria, receiving search results, and accepting transportation of a load.

DETAILED DESCRIPTION

Figure 1:
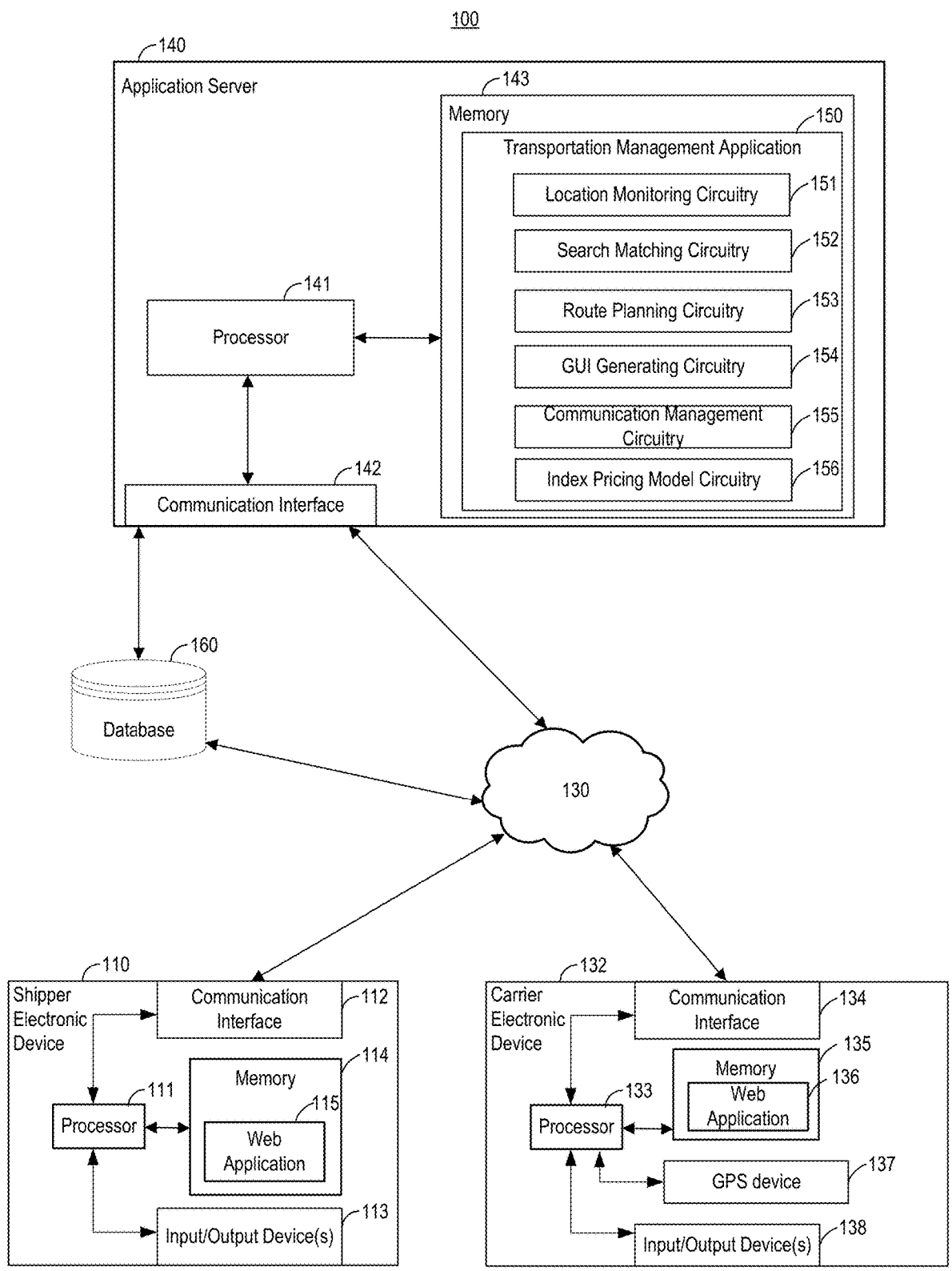
FIG. 1 illustrates an exemplary communication system.

The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

Various types of goods may be transported, such as vehicles (e.g., cars, trucks, boats, etc.), consumer electronics, or the like. In this regard, any type of freight or cargo is contemplated. Typically, there are two parties to the transport of a good, including a shipper and a carrier, with the shipper requesting transport of the goods and the carrier performing the transport of the goods. Examples of shippers include various types of vehicle dealers such as car dealerships, auction houses, brick-and-mortar stores, on-line stores, and the like. Examples of vehicle carriers include trucking companies, flatbed operators, tow truck operators, and the like.

The transportation process may be divided into various stages, including identification, communication, agreement, shipment, and payment. In the first stage, one party to the transport of the good may be identified to the other party. For example, potential carriers may be identified to a shipper, or potential shippers may be identified to a carrier. In the second stage, the shipper(s) and carrier(s) communicate with one another in order to discuss terms of the shipment. In a third stage, the shipper and carrier may come to an agreement. The agreement may include when the carrier will pick up the item and potentially how the carrier will be paid (e.g., what bank account). In a fourth stage, the carrier may pick up and ship the goods. Finally (though not necessarily the last stage), payment may be arranged between the shipper and the carrier.

A communication system may aid one, some, or all of the above stages of the transport. In one implementation, the communication system may use graphical user interfaces (GUIs), as discussed in more detail below. Alternatively, or in addition, the communication system may be used in combination with a monitoring system in which the location of one or more parties to the transport of the good is monitored, such as monitoring potential carriers and/or monitoring potential shippers (to the extent the shipper may be mobile). As discussed in more detail below, the monitoring of carriers and/or shippers may be based on the Global Positioning System (GPS), with the carriers and/or shippers using GPS receivers or other type of GPS navigation device to accurately calculate the respective geographical location by receiving information from GPS satellites. Other location generating methodologies are contemplated.

Figure 6:
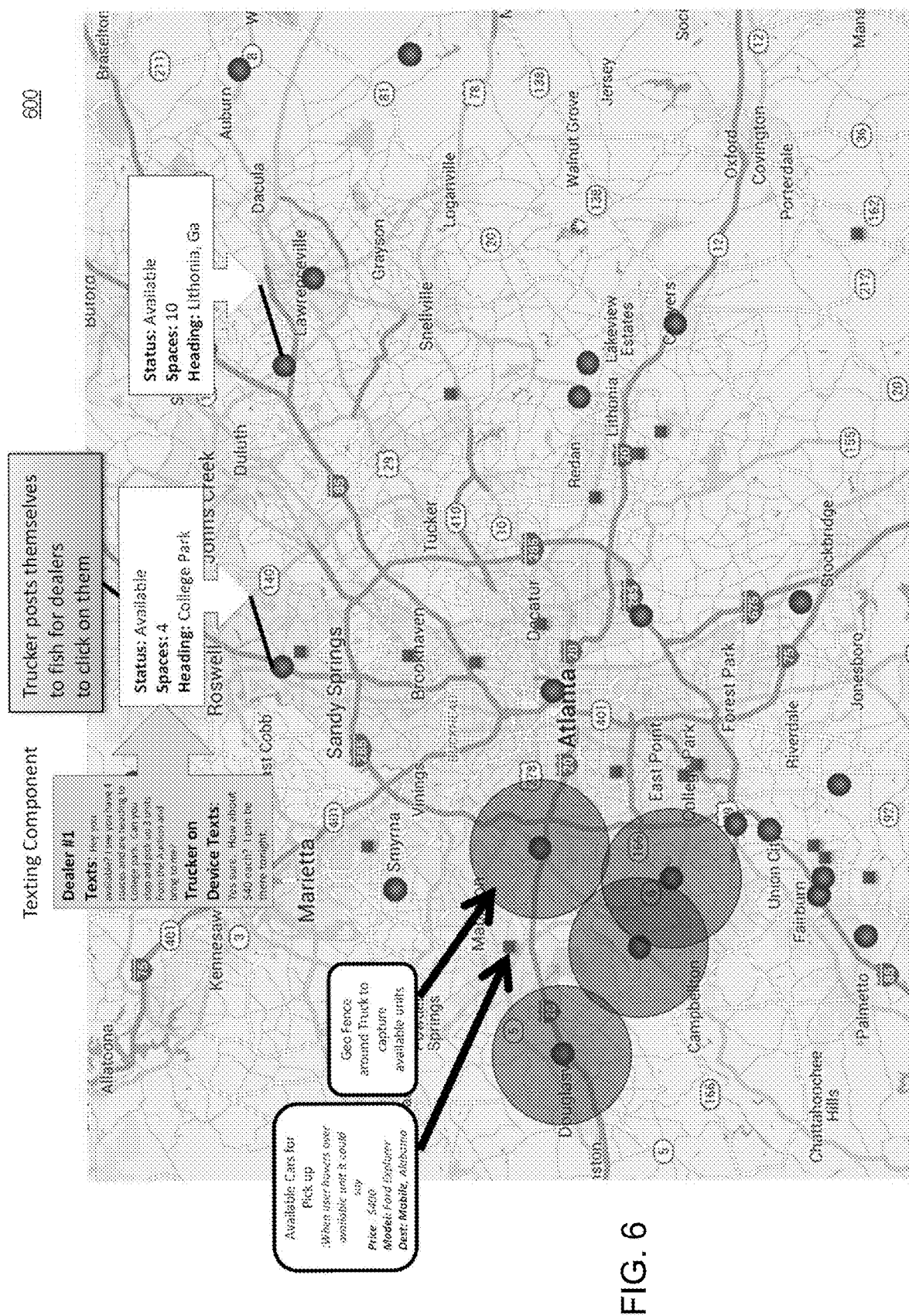
FIG. 6 illustrates an exemplary GUI showing shippers, carriers and geo-fence distance.

In one aspect, a GUI may be used for one or more purposes, including to convey information, to output search results, to plan a route, to enable agreement between the shipper and carrier (e.g., to provide bidding or acceptance screens), to determine where to purchase a vehicle, to determine where to sell a vehicle, or the like. For example, the system may generate maps that integrate the shipper information and/or carrier information on the GUI. As discussed below, an example is illustrated in FIG. 6. As another example, the system may generate maps that determine potential selling locations or potential purchasing locations. The maps may be generated in real-time or at a future time. Further, the maps may be generated based on input for various attributes. As discussed in more detail below, attributes include, but are not limited to: timing (e.g., when can the delivery be performed); price; gas prices; zip code; availability (e.g., number of empty spaces on a shipper's transportation vehicle); and distance. The attributes may be input in a variety of ways. In one way, sliders may be used to input the various attributes, such as a slider for timing (from NOW to 1 week from now), a slider for price, and/or a slider for distance (from 0 miles to 500 miles).

Responsive to the attribute input, the system may generate the GUI. In one implementation, an initial GUI illustrating all of the different shippers and/or carriers within a certain geographic area (such as the city of Richmond, Virginia) may be output. After the input of the various attributes, the system may generate an updated GUI, with the updates to reflect the subset of carriers and/or dealers that meet the input attributes. In a first specific implementation, the GUI may only include indicators (such as icons) that match the various attributes input. In a second specific implementation, the GUI may include icons of all carriers and/or dealers, and may modify the icons to reflect the various attributes input. As one example, the GUI may be modified to gray-out the icons that do not match the various attributes input.

Location information for the carrier and the shipper may be determined in one of several ways. In one way, the location may be determined in real-time, such as via a GPS receiver (e.g., the location associated with a carrier may be determined by the signal from the GPS receiver associated with the carrier). In another way, the location may be determined via accessing a database that stores carrier information (e.g., a location associated with the carrier) or shipper information (e.g., a location associated with the shipper). In still another way, the location may be determined by receiving input (e.g., responsive to a request for location information, the carrier or shipper may provide a location of the carrier or shipper, respectively).

Direction information for the carrier (and potentially for the shipper, in the instance of a mobile shipper) may likewise be determined in one of several ways. In one way, the direction information may be determined in real-time, such as via a GPS receiver (e.g., the direction associated with a carrier may be determined by sampling the signal from the GPS receiver associated with the carrier multiple times and calculating a direction). In another way, the direction information may be determined via accessing a database that stores carrier information (e.g., direction information associated with a pre-planned route of the carrier). In still another way, the direction information may be determined by receiving input (e.g., responsive to a request for location information, the carrier may provide direction information of the carrier).

For real-time mapping, the shipper or carrier may input various criteria to generate a real-time map. For example, a shipper may input any one, any combination, or all of: (1) location information (e.g., pick up location for the vehicle and/or destination location where the vehicle is to be shipped); (2) vehicle carrier capacity information (e.g., requirements for carrier capabilities); (3) pricing information; (4) information regarding the vehicle subject to shipping (e.g., to search for carriers that have a preference for a type of vehicle and/or a make/model the respective carrier wishes to carry); etc. The location information may comprise a designated city (e.g., College Park, MD) or may comprise a designated sector (e.g., 10 mile radius around the shipper's current location). In particular, the shipper may generally request: "show me all carriers in College Park, MD right now". More specifically, the shipper may request: "show me the real-time locations of all carriers in College Park, MD". Alternatively, the shipper may request: "show me the home location (which may not necessarily be the same as the real-time location) of all carriers that have registered and have indicated that they are ready to pick-up in College Park, MD". As another example, the shipper may input vehicle carrier capacity information such as the volume of product that the carrier may transport (e.g., 4 or more vehicle spaces, or towing capacity, or volume capable of transport). As still another example, the shipper may input pricing information, such as a not-to-exceed amount to ship a vehicle. The listed shipping criteria are merely for illustration purposes. Other criteria are contemplated.

As another example, the carrier may input various criteria including any one, any combination, or all of: (1) location information (e.g., pick up location for the vehicle and/or destination location where the vehicle is to be shipped); (2) vehicle carrier capacity information; (3) direction information; (4) pricing information; (5) information regarding the vehicle subject to shipping (e.g., carrier may indicate the type of vehicle and/or the make/model it wishes to carry); etc. In particular, the carrier may request: "show me all shippers in College Park, MD that need a pickup right now"; "show me all shippers that have 4 or more cars for pickup"; "show me all shippers that have a vehicle that has a destination along the way to Phoenix, AZ"; "I'm driving local today, show me all local shippers"; "I have 10 spaces"; etc. In response to the carrier request, the system may output shippers that meet the requested criteria.

In another implementation, an initial GUI illustrating potential sellers or purchasers. In a first specific implementation, the GUI may include potential sellers, such as on a map relative to the purchaser's location. In a second specific implementation, the GUI may include potential buyers, such as on a map relative to the seller's location.

Alternatively, maps may be generated for a future time, such as at a predetermined date or a predetermined time from the present. For example, the map may be generated for a predetermined time of the day (such as at 9:00 am, when the workday begins) or for a predetermined time in the future (e.g., in 3 days time). Similar to the criteria for real-time mapping, the shipper and/or carrier may input: (1) location information; (2) vehicle carrier capacity information; (3) pricing information; etc. In particular, the carrier may request: "I'm willing to drive locally today and do not have any destinations yet"; "I'm travelling to College Park today and am willing to drive locally". Likewise, the shipper may request "I need to see the carriers in the area on Monday next week". Similarly, the carrier may indicate direction information, such that it is travelling in a general direction (e.g., eastward) or in a specific direction (e.g., along 1-94 near Chicago). Responsive to the requests, the system may output shippers or carriers that meet the requested criteria. In the implementation of a GUI for potential buyers or sellers, the GUI may be generated for a current time. Alternatively, the GUI may be generated for predetermined future time, such as 1 week from the current time.

As discussed above, the results of the search request may be output in map format. Additional information may be integrated with the map, and may be output based on user input. For example, the map may include data points indicative of a carrier or a shipper. A respective data point may have associated with it additional data. The additional data may be output via an action by the user, such as clicking on the respective data point with a mouse or hovering over the respective data point with the mouse. For example, the shipper may hover over a carrier data point to obtain information about the carrier, such as: the status of the carrier (available or not available); the capacity of the carrier (e.g., the number of vehicle spaces available); the heading or direction of the carrier; or the like. As another example, the carrier may hover over a shipper data point to obtain information about the shipper, such as: the price offered to ship the good (e.g., $400); the good to ship (e.g., a 2014 Ford Explorer); the pickup location; the delivery address (e.g., Atlanta, GA); or the like. In the implementation of a GUI for potential buyers or sellers, the additional information may be integrated with the map may include price/timing or the like.

As another aspect, communication may be integrated with a GUI output. For example, the GUI may indicate carriers or shippers. A user action, such as a mouse click or hovering, may initiate communication. In particular, a shipper may click on an icon (indicative of a particular carrier) on the GUI in order to initiate communication with the particular carrier. Likewise, a carrier may click on an icon (indicative of a particular shipper) on the GUI in order to initiate communication with the particular shipper. The communication between shipper and carrier may be direct (without the system acting as an intermediate router). Alternatively, the communication between shipper and carrier may be indirect, with the system acting as an intermediate router.

One or both of the carrier and shipper may initiate the communication session. As one example, the shipper may send to the system a communication, such as "I need 200 cars shipped, with the various criteria (e.g., pricing, pick-up location, drop-off location, etc.)". The system may then begin the process (sending the subset of carriers who meet the criteria to the shipper for the shipper to contact the carriers to arrange a pickup); or the system then contacts the carriers and arranges the pickup. As another example, the carrier may send various parameters to the system, such as "I am available from Monday-Friday for pickups; I only want to travel locally (within 50 miles)". The system may, using this information, select a subset of shippers. In one implementation, the system sends the subset of shippers who meet the criteria to the carrier in order for the carrier to contact the shippers to arrange a pickup. Alternatively, the system then contacts the shippers and arranges the pickup.

Similarly, in the implementation of a GUI for potential buyers or sellers, communication may be integrated with a GUI output. As one example, the seller may contact potential buyers via the GUI. As another example, the buyer may contact potential sellers via the GUI.

As another example, the system may generate a GUI for transmission to the shipper, with the GUI indicating multiple carriers. The shipper may click on an icon for a particular carrier, resulting in the shipper device sending the device ID of the shipper and an indication that the shipper wants to communicate with the particular carrier associated with the clicked icon. The server may then access a lookup table, using information associated with the particular carrier, to determine the communication address associated with the particular carrier, and then send a communication to the communication address associated with the particular carrier. The communication to the communication address associated with the particular carrier may be on behalf of the system or may be on behalf of the shipper. In turn, the carrier may respond to the communication. The carrier response may comprise sending a return communication to the system, with the system relaying the carrier response to the shipper. Alternatively, the carrier response may comprise sending a return communication directly to the shipper (without an intermediate relay through the system).

Likewise, the carrier may initiate communication via the GUI. For example, the system may generate a GUI for transmission to the carrier, with the GUI indicating multiple shippers. The carrier may click on an icon for a particular shipper, resulting in the carrier device sending the device ID of the carrier and an indication that the carrier wants to communicate with the particular shipper associated with the clicked icon. The server may then access a lookup table, using information associated with the particular shipper, to determine the communication address associated with the particular shipper, and then send a communication to the communication address associated with the particular shipper. The communication to the communication address associated with the particular shipper may be on behalf of the system or may be on behalf of the carrier. In turn, the shipper may respond to the communication. The shipper response may comprise sending a return communication to the system, with the system relaying the shipper response to the shipper. Alternatively, the shipper response may comprise sending a return communication directly to the carrier (without an intermediate relay through the system).

Thus, in one implementation, communication between carriers and shippers is a two-step process including: (1) information (such as in the form of a GUI) is provided to the party that will initiate contact; and (2) initiating party can then, using the GUI, contact the other party. With regard to information, a shipper is sent a GUI of carriers that are available. In one implementation, the locations of the carriers in the GUI are changing (e.g., the carriers are mobile). Alternatively, the locations of the carriers in the GUI are all stationary (e.g., the carrier location is a "home" location and is therefore currently stationary). In still an alternative implementation, the locations of the carriers in the GUI are either mobile or stationary.

Further, in one implementation, the GUI includes the location of the carrier and at least one other piece of information descriptive of the carrier. For example, as illustrated below with regard to FIG. 6, the location of the carrier may be indicated by an icon on a map. The at least one other piece of information may comprise any one, any combination, or all of the following: the geocast of the carrier; the number of slots available to the carrier; the destination of the carrier; etc.

Likewise, with regard to information, a carrier is sent a GUI of shippers requesting goods. In one implementation, the locations of the shippers in the GUI are stationary (e.g., the shipper location is a "home" location). Alternatively, to the extent a shipper may be changeable, the location of the shippers in the GUI are all changeable. In still an alternative implementation, the locations of the shippers in the GUI are either mobile or stationary.

Further, in one implementation, the GUI includes the location of the shipper and at least one other piece of information descriptive of the carrier. The at least one other piece of information may comprise any one, any combination, or all of the following: the number of goods (e.g., vehicles) the shipper needs shipped; payment terms; the timing of pickup of the goods; the destination; etc.

As discussed above, the initiating party may use the GUI to contact the other party. For example, the shipper may click on the icon representative of a particular carrier in order to communicate with the particular carrier. Communication may comprise any one type of electronic communication such as: (1) a text message; (2) a telephone call; (3) an email; etc. Further, in response to initiating communication, the GUI may be updated to reflect that the other party has been contacted. In this regard, the GUI may be updated to reflect the stage of communication amongst the parties. Example stages of communication include: initiating contact with other party; response received from other party (but awaiting response from initiating party); response sent from initiating party; and agreement. The update to the GUI may comprise a change in icon status. For example, the color of the icon may change color and/or size depending on the stage of communication. Alternatively or in addition, the additional information associated with the icon may be changed. As discussed in more detail below, the additional information associated with the icon may be shown by clicking on or hovering over the icon. In this regard, the information as to the stage of communication may be reflected in the additional information and may be display in response to user input. In one implementation, in response to an agreement, the GUI may be updated to remove those items from display (e.g., once an agreement is reaches as to certain vehicles, the GUI is updated to remove the vehicles from display).

As illustrated below in FIG. 6, icons for carriers may comprise circles and icons for shippers may comprise squares. In this way, the icons for carriers may be different from the icons for shippers. In response to the stage of communication, the respective icon may change color and/or may change shape. In this way, the viewer to the GUI may readily determine a stage of communication.

In addition to (or instead of) updating the GUI to reflect the stage of communication, the GUI may be updated with the content of the communication. As discussed in more detail below, the carrier and shipper may exchange messages. The messages may include pricing, timing, or the like. In this regard, the at least one other piece of information descriptive of the carrier or shipper (described above) may be updated to reflect the communication (e.g., the latest pricing offer). For example, the "agreement" between the shipper and the carrier may include when the carrier will pick up the item and potentially how the carrier requests payment (e.g., what bank account). This "agreement" information (e.g., the pickup date/time) may then be used to update the GUI. In one implementation, once an "agreement" occurs, those products (or other items) are removed from other GUIs As discussed above, communication may be based on one or more location identifiers. One example of a location identifier is a geo-fence. A geo-fence may be based on GPS or radio frequency identification (RFID) to define a geographic boundary. The geo-fence may comprise a virtual perimeter for a real-world geographic area. In practice, the geo-fence may be dynamically generated. With regard to a mobile carrier, the geo-fence may comprise a radius around the mobile carrier's location. In the case of a mobile shipper (such as when the shipper is considered a vehicle in need of a tow from a tow truck), the geo-fence may comprise a radius around the mobile shipper's location. With regard to stationary carriers or shippers, the geo-fence may be a predefined set of boundaries (such as a predefined radius).

In one implementation, the geo-fence may be used to trigger one or more actions. As one example, the geo-fence may be used to trigger the sending of a message (e.g., a geocast). In the instance of a particular carrier that is mobile, the geo-fence (defined around the current location of the particular carrier) may be monitored. When the geo-fence overlaps another area (such as the geo-fence of another shipper or another carrier), the system may trigger the sending of the message (e.g., e-mail, text message, telephone call, etc.), such as sending a message to the carrier and/or to the shipper. For example, the particular carrier may indicate to the system one or more criteria for sending a message. One criterion is that the carrier is "available" and ready to pick up a good (e.g., has the capacity to pick up a vehicle). The carrier may indicate other criteria such as: how many vehicles that he can pick up (e.g., how many vehicle slots); the size of the vehicles he can pick up; the price per vehicle picked up; and the range of the destination (e.g., how many miles away the carrier is willing to drive, which may be adjustable based on the amount paid for shipping).

Similarly, the particular shipper may indicate to the system one or more criteria for sending a message. One criterion is that the shipper has a good for pick up (e.g., has a vehicle that needs to be shipped). The shipper may indicate other criteria such as: how many vehicles to be picked up; the size of the vehicles to be picked up; the price per vehicle picked up; and the destination (e.g., where the vehicles are to be delivered).

Thus, the system may monitor the geo-fence of the particular carrier for shippers that are within the geo-fence and meet the one or more criteria set by the particular carrier. In response to the system determining a match (e.g., a shipper within the geo-fence of the particular carrier that meets the one or more criteria set by the particular carrier), the system may push the message to the particular carrier.

The message sent to the particular carrier may comprise one or more alerts sent to the particular carrier's electronic device. In response to receipt of the one or more alerts, the particular carrier's electronic device may perform one or more electronic actions, including, without limitation: auto-launch a viewer application such that the carrier can view the one or more alerts. The one or more alerts may be indicative of an offer to pick-up a good for transport. In particular, the offer may be to drive "X" miles to pick up "Y" number of cars to drive to "Z" place for a certain amount of money.

In response to the message sent, the carrier may accept the offer. For example, the alert may include a link, which when clicked, indicates to the server in the system acceptance of the offer. Alternatively, or in addition, another link may be included in the alert, which when activated, indicates declining of the offer.

Alternatively, the carrier may send a counter-offer (e.g., for a higher amount paid). In this regard, the alert may include a link, which when activated, may allow the carrier to submit to the server the counter-offer.

Likewise, in response to the system determining a match (e.g., a shipper within the geo-fence of the particular carrier that meets the one or more criteria set by the particular shipper), the system may push the message to the particular shipper. Similar to the discussion above, the message sent to the particular shipper may comprise one or more alerts sent to the particular shipper's electronic device. In response to receipt of the one or more alerts, the particular shipper's electronic device may perform one or more electronic actions, including, without limitation: auto-launch a viewer application such that the carrier can view the one or more alerts. The one or more alerts may be indicative of an offer to ship a good for transport. In particular, the offer may be for pickup of a good (such as a vehicle) and to deliver to a destination for a certain amount of money.

In response to the message sent, the shipper may accept the offer. For example, the alert may include a link, which when clicked, indicates to the server in the system acceptance of the offer. Alternatively, or in addition, another link may be included in the alert, which when activated, indicates declining of the offer.

Alternatively, the shipper may send a counter-offer (e.g., for a lower amount paid). In this regard, the alert may include a link, which when activated, may allow the shipper to submit to the server the counter-offer.

The use of a geo-fence (or other location indicator) may be in real-time or at a future time. For example, in real-time, the system may determine whether the current geo-fence of the carrier overlaps with the location of the shipper. As discussed above, optionally, the system may check for one or more further criteria, as discussed above, prior to determining whether to send a message. Alternatively, the system may determine whether, at a future time, the current geo-fence of the carrier will overlap with the location of the shipper. The future time may be predetermined, such as in 1 hour, in 1 day, in 1 week, etc. In this regard, the system may, in one implementation, estimate a future position of the carrier based on current speed, trajectory, etc. (e.g., in one hour) and determine whether the future position (and associated future geo-fence) overlap the location of the shipper at the predetermined future time. Alternatively, the system may determine whether (and when) the geo-fence of the carrier will overlap the location of the shipper. In particular, the system may first determine whether, based on the trajectory of the carrier, whether the geo-fence of the carrier will overlap the location of the shipper at any future time. The future time may be open-ended, or may be close-ended (within 1 week). If the system determines that there is an overlap at a future time, the system may then send a message (to either the carrier or to the shipper) and an indication when the future time will occur (e.g., carrier "X" will be at shipper "Y" in 3 days).

Further, the geo-fence (or other location indicator) may be static or dynamic. In one implementation, the geo-fence may be predetermined (e.g., set by the system or set by the carrier/shipper). For example, the carrier may indicate to the system that a 20 mile geo-fence radius is desired. Alternatively, the geo-fence may be dynamic. For example, the geo-fence may be configurable by the carrier or the shipper. In one implementation, the carrier or shipper may manually change the geo-fence radius. In particular, the carrier may indicate varying geo-fencing based on the offer provided. (e.g., if the offer to ship is $100 or less, the geo-fence is 10 miles; if the offer is $200 or more, the geo-fence is 20 miles). Alternatively, the geo-fence may be automatically configurable.

FIG. 1 illustrates an exemplary location-based transportation management system 100 (the "system") that includes component devices for implementing the described features. The system 100 includes an application server 140 configured to include the hardware, software, firmware, and/or middleware for operating a transportation management application 150. Application server 140 is shown to include a processor 141, a memory 143, and a communication interface 142. The transportation management application 150 is described in terms of functionality to manage various stages of transportation.

Transportation management application 150 may be a representation of software, hardware, firmware, and/or middleware configured to implement the management of any one, any combination, or all of the stages of transportation (e.g., identification, communication, agreement, shipment, and payment, described above). In one implementation, the transportation management application 150 may be a web-based application operating, for example, according to a .NET framework within the system 100. More specifically, the transportation management application 150 may include location monitoring circuitry 151, search matching circuitry 152, route planning circuitry 153, GUI generating circuitry 154, communication management circuitry 155, and index pricing model circuitry 156.

Location monitoring circuitry 151 may, in one implementation, only monitor the location of the carriers. In this regard, it is assumed that the locations of the shippers are constant. Further, the location monitoring circuitry 151 may monitor the current, real-time location of the shippers. Alternatively, the location monitoring circuitry 151 may estimate a future location of respective carriers. As another example, location monitoring circuitry 151 may, in one implementation, monitor the location of both the carriers and the shippers. In this regard, it may be assumed that the locations of the shippers are dynamic and changing.

Search matching circuitry 152 may access search criteria for one or both of shippers and carriers, and determine whether there is a matched based on the accessed criteria. For example, search matching circuitry 152 may access one or more carrier criteria, such as location information, vehicle capacity information, direction information, pricing information, etc. and may access shipper information, such as location information, vehicle carrier capacity information, pricing information, etc. to determine whether there is a match (e.g., partial or full match) of the carrier criteria and shipper criteria. Route planning circuitry 153 may, using criteria from carriers, generate a planned route for one or more carriers. The planned route may be for transmission to one or both of carriers and shippers. GUI generating circuitry 154 may generate one or more GUIs for transmission to carriers and/or shippers. And, communication management circuitry 155 may manage communications between carriers and shippers, as discussed in more detail below.

Index pricing model circuitry 156 may comprise circuitry configured to implement an index pricing model. As discussed above, goods, such as vehicles, may be moved for a cost. In one implementation, the index pricing model is implemented in order to move the good (e.g., the vehicle) efficiently (in terms of cost and/or time) for both the shipper and carrier. In the example of moving vehicles, the highway system may be viewed as akin to a circulatory system, with highways across the country and up/down the country. In this type of system, there are instances where cars are close to the highly traveled routes of the highway system. For example, shipping vehicles from Atlanta, Georgia to Richmond, Virginia is commonly performed. The 700 mile trip from Atlanta, Georgia to Richmond, Virginia is predetermined in its cost (e.g., about $150 per vehicle, and can be less if you ship more than one vehicle at a time). In contrast, there may be instances of "orphan" cars, or cars that are off the beaten path (far enough off of the well-traveled highway routes that it may take a long time before the car is picked up). For example, shipping vehicles from Chicago, Illinois to Wynot, North Dakota is not commonly performed. As a result, the cost estimate for the 700 mile trip from Chicago, Illinois to Wynot, North Dakota varies widely.

In this regard, the various routes within the highway system may be assigned a respective "popularity factor" (or a "bias"). For example, the route from Atlanta, Georgia to Richmond, Virginia is more frequently traveled and has a higher "popularity factor" than the route from Chicago, Illinois to Wynot, North Dakota Thus, even with all of the aggregation that may occur, for any given route that is less popular, estimates for that less popular route will vary wildly (e.g., a range from $500 to $2,000). In one implementation, use of the index pricing model may reduce the variance in estimates.

The index pricing model may be used to select the pricing. For example, in one implementation, the index pricing model may be used to select the initial set price offered for the particular route. In an alternate implementation, subsequent price changes (e.g., if no carriers are found) may be selected using the index pricing model. In still an alternate implementation, both the initial set price and the subsequent price changes may be selected using the index pricing model.

In selecting the price (e.g., the initial price and/or the price changes), one, some, or all of the following factors may be used: the number of carriers that are "available" (e.g., the carriers that, based on their profile, meet the criteria of distance, location and price); and the time in which an offer at the initial prices has remained without an acceptance.

As discussed in more detail herein, the index pricing model, implemented by the index pricing model circuitry 156, may be used with various other functionality described herein, such as generating one or more GUIs, searching and communications amongst the different electronic devices (e.g., communications between the system and the carriers/shippers), generating alerts, and the like. For example, the GUI sent to the carrier and/or shipper may be changed to reflect the index pricing model. As another example, the geo-fence for a respective carrier may be used to communicate with (and entice) the pickup of a vehicle. Likewise, the alerts sent to the different electronic devices may be sent based on the index pricing model. This enticement (and communication) with the carrier may be performed in real-time (or near real-time). For example, the carrier may be sent an electronic message (which may include an alert) when the current location of the geo-fence associated with the carrier is within a predetermined distance from the pick-up location. Alternatively, the carrier may be sent an electronic message when a future location of the geo-fence associated with the carrier is within a predetermined distance from the pick-up location.

Each of the location monitoring circuitry 151, search matching circuitry 152, route planning circuitry 153, GUI generating circuitry 154, communication management circuitry 155, and index pricing model circuitry 156 may be a representation of software, hardware, firmware, and/or middleware configured to implement respective features of the transportation management application 150.

The system 100 may further include a database 160 for storing data for use by the transportation management application 150. For example, one or both of shippers and carriers may register with the system 100. The registration may comprise submission of criteria, which may be used for search matching and route planning. In particular, one or more criteria may be stored for respective carriers, which may later be used for selecting subsets of respective carriers to be included in a GUI. Example criteria may include any one, any combination, or all of: (1) a type of good the respective carrier is capable of shipping (e.g., a type of vehicle, such as a compact car, an SUV, a truck, etc.); (2) a number of goods the respective carrier is capable of shipping (e.g., 3 vehicles at a time); (3) a minimum price that will be accepted for shipping the good; (4) a maximum distance the respective carrier is willing to travel from a current location (as determined by a GPS receiver on a mobile device associated with the respective carrier) and/or from a home location associated with the respective carrier. The criteria associated with the respective carrier may be dynamically updated, such as the number of goods the carrier is capable of shipping (e.g., the number of vehicles may depend on a number of vehicles that the respective carrier currently has loaded and is presently shipping; responsive to delivering a vehicle to a destination, the number of vehicles for the respective carrier may be dynamically updated).

Likewise, one or more criteria may be stored for respective shippers, which may later be used for selecting subsets of respective shippers to be included in a GUI. Example criteria may include any one, any combination, or all of: (1) a location of the good (e.g., a location for pickup of the vehicle and/or a location of the destination for delivery); (2) a type of good the respective shipper seeks to ship (e.g., a type of vehicle, such as a compact car, an SUV, a truck, etc.); (3) a number of goods the respective shipper seeks to ship (e.g., 3 vehicles at a time); and (4) a maximum price that will be paid for shipping the good. The criteria associated with the respective shipper may be dynamically updated, such as the number of goods the shipper seeks to ship, the type of goods for shipping, the maximum price, etc.

The application server 140 may communicate with the database 160 directly to access the data. Alternatively, the application server 140 may also communicate with the database 160 via network 130 (e.g., the Internet). Though FIG. 1 illustrates direct and indirect communication, in one implementation, only direct communication is used, in an alternate implementation, only indirect communication is used, and still in an alternate implementation, both direct and indirect communication is used.

The application server 140 may communicate with any number and type of communication devices via network 130. For example, application server 140 may communicate with electronic devices associated with shippers and carriers. For example, FIG. 1 depicts a single shipper electronic device 110 and a single carrier electronic device. The depiction in FIG. 1 is merely for illustration purposes. In one implementation, multiple shipper electronic devices and multiple carrier electronic devices are contemplated. In an implementation, a single shipper electronic device and multiple carrier electronic devices are contemplated. In still an alternate implementation, multiple shipper electronic devices and a single carrier electronic device are contemplated.

Shipper electronic device 110 and carrier electronic device 132 shown in FIG. 1 may include well known computing systems, environments, and/or configurations that may be suitable for implementing features of the transportation management application 150 such as, but are not limited to, smart phones, tablet computers, personal computers (PCs), server computers, handheld or laptop devices, multiprocessor systems, microprocessor-based systems, network PCs, server computers, minicomputers, mainframe computers, embedded systems, distributed computing environments that include any of the above systems or devices, and the like. FIG. 1 further shows that the shipper electronic device 110 includes a processor 111, a memory 114 configured to store the instructions for operating a web application 115 (web application 115 may be a part of the transportation management application 150 in that the web application 115 communicates with the transportation management application 150), an input/output device(s) 113, and a communication interface 112. A shipper operating the shipper electronic device 110 may run the web application 115 to access the transportation management application 150 running on the application server 140.

Similarly, carrier electronic device 132 includes a processor 133, a memory 135 configured to store the instructions for operating a web application 136 (web application 136 may be a part of the transportation management application 150 in that the web application 136 communicates with the transportation management application 150), an input/output device(s) 138, and a communication interface 134. Carrier electronic device 132 further includes a GPS device 137, such as a GPS receiver configured to generate a current location of carrier electronic device 132. Carrier electronic device 132 may send its current location, using GPS device 137, to application server 140. In one implementation, carrier electronic device 132 may be triggered to send its current location in response to a request from application server 140. Alternatively, or in addition, carrier electronic device 132 may be triggered to send its current location based on a determination internal to carrier electronic device 132. Though FIG. 1 illustrates GPS device 137, other types of location generating electronics are contemplated. Similar to the shipper electronic device 110, a carrier operating the carrier electronic device 132 may run the web application 136 to access the transportation management application 150 running on the application server 140.

The various electronic devices depicted in FIG. 1 may be used in order to implement the functionality discussed herein. In this regard, each of shipper electronic device 110, carrier electronic device 132, application server 140, and database 160 may include one or more components of computer system 200 illustrated in FIG. 2.

Figure 2:
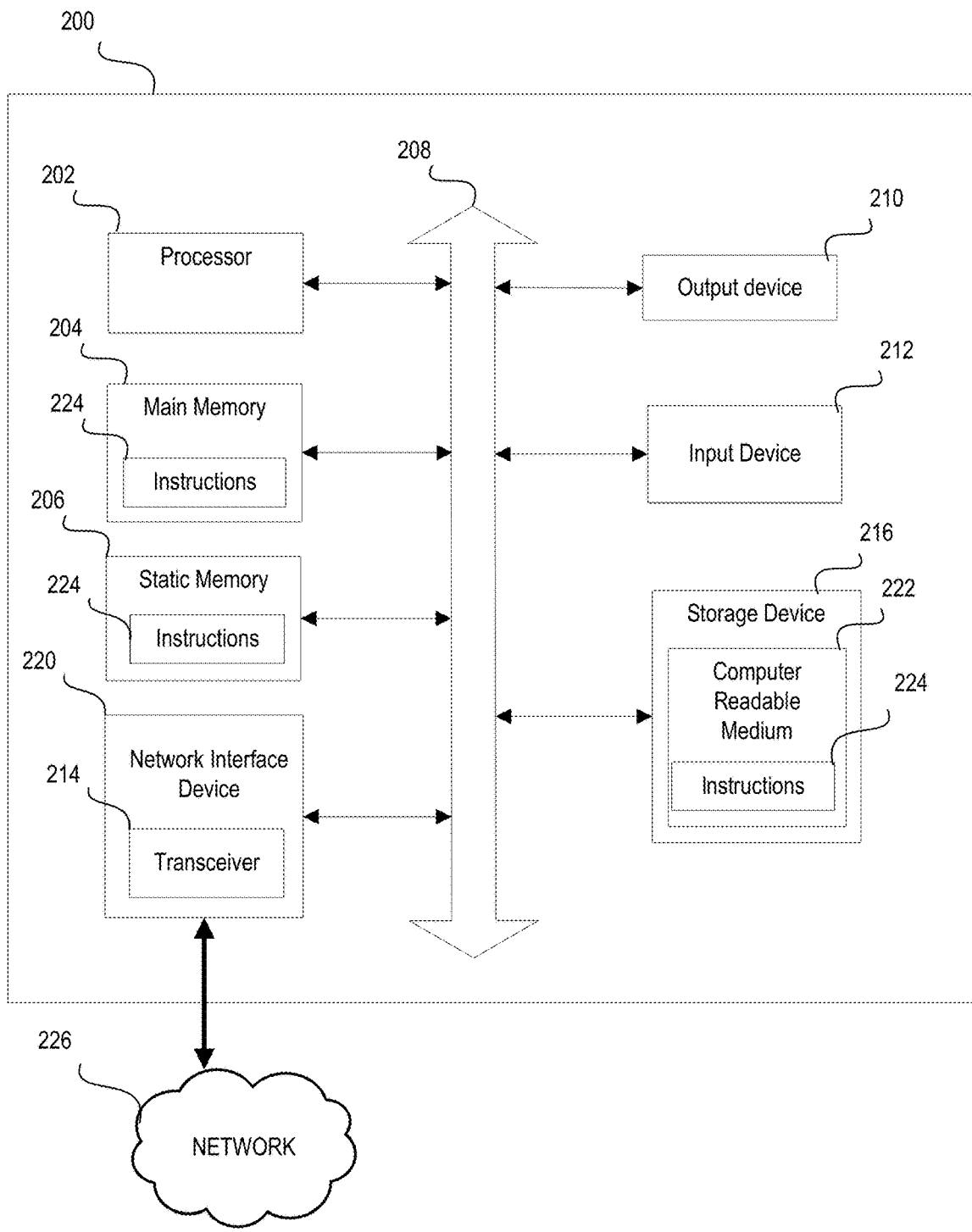
FIG. 2 illustrates a block diagram of exemplary computer architecture for a device in the exemplary communication system of FIG. 1.

FIG. 2 illustrates exemplary computer architecture for computer system 200. Computer system 200 includes a network interface 220 that allows communication with other computers via a network 226, where network 226 may be represented by network 130 in FIG. 1. Network 226 may be any suitable network and may support any appropriate protocol suitable for communication to computer system 200. In an implementation, network 226 may support wireless communications. In another implementation, network 226 may support hard-wired communications, such as a telephone line or cable. In another implementation, network 226 may support the Ethernet IEEE (Institute of Electrical and Electronics Engineers) 802.3x specification. In another implementation, network 226 may be the Internet and may support IP (Internet Protocol). In another implementation, network 226 may be a LAN or a WAN. In another implementation, network 226 may be a hotspot service provider network. In another implementation, network 226 may be an intranet. In another implementation, network 226 may be a GPRS (General Packet Radio Service) network. In another implementation, network 226 may be any appropriate cellular data network or cell-based radio network technology. In another implementation, network 226 may be an IEEE 802.11 wireless network. In still another implementation, network 226 may be any suitable network or combination of networks. Although one network 226 is shown in FIG. 2, network 226 may be representative of any number of networks (of the same or different types) that may be utilized.

The computer system 200 may also include a processor 202, a main memory 204, a static memory 206, an output device 210 (e.g., a display or speaker), an input device 212, and a storage device 216, communicating via a bus 208.

Processor 202 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. Processor 202 executes instructions 224 stored on one or more of the main memory 204, static memory 206, or storage device 215. Processor 202 may also include portions of the computer system 200 that control the operation of the entire computer system 200. Processor 202 may also represent a controller that organizes data and program storage in memory and transfers data and other information between the various parts of the computer system 200.

Processor 202 is configured to receive input data and/or user commands through input device 212. Input device 212 may be a keyboard, mouse or other pointing device, trackball, scroll, button, touchpad, touch screen, keypad, microphone, speech recognition device, video recognition device, accelerometer, gyroscope, global positioning system (GPS) transceiver, or any other appropriate mechanism for the user to input data to computer system 200 and control operation of computer system 200 and/or operation of the transportation management application 150. Input device 212 as illustrated in FIG. 2 may be representative of any number and type of input devices.

Processor 202 may also communicate with other computer systems via network 226 to receive instructions 224, where processor 202 may control the storage of such instructions 224 into any one or more of the main memory 204 (e.g., random access memory (RAM)), static memory 206 (e.g., read only memory (ROM)), or the storage device 216. Processor 202 may then read and execute instructions 224 from any one or more of the main memory 204, static memory 206, or storage device 216. The instructions 224 may also be stored onto any one or more of the main memory 204, static memory 206, or storage device 216 through other sources. The instructions 224 may correspond to, for example, instructions that make up the data retention strategy and the transportation management application 150 or web application 115 illustrated in FIG. 1.

Although computer system 200 is represented in FIG. 2 as a single processor 202 and a single bus 208, the disclosed implementations applies equally to computer systems that may have multiple processors and to computer systems that may have multiple busses with some or all performing different functions in different ways.

Storage device 216 represents one or more mechanisms for storing data. For example, storage device 216 may include a computer readable medium 222 such as read-only memory (ROM), RAM, non-volatile storage media, optical storage media, flash memory devices, and/or other machine-readable media. In other implementations, any appropriate type of storage device may be used. Although only one storage device 216 is shown, multiple storage devices and multiple types of storage devices may be present. Further, although computer system 200 is drawn to contain the storage device 216, it may be distributed across other computer systems that are in communication with computer system 200, such as a server in communication with computer system 200. For example, when computer system 200 is representative of shipper electronic device 110 and carrier electronic device 132, storage device 216 may be distributed across to application server 140 when shipper electronic device 110 and/or carrier electronic device 132 is in communication with application server 140 during operation of the transportation management application 150 and/or web application 115.

Storage device 216 may include a controller (not shown) and a computer readable medium 222 having instructions 224 capable of being executed by processor 202 to carry out functions of the transportation management application 150 and/or web application 115. In another implementation, some or all of the functions are carried out via hardware in lieu of a processor-based system. In one implementation, the controller included in storage device 216 is a web application browser, but in other implementations the controller may be a database system, a file system, an electronic mail system, a media manager, an image manager, or may include any other functions capable of accessing data items. Storage device 216 may also contain additional software and data (not shown), for implementing described features.

Output device 210 is configured to present information to the user. For example, output device 210 may be a display such as a liquid crystal display (LCD), a gas or plasma-based flat-panel display, or a traditional cathode-ray tube (CRT) display or other well-known type of display in the art of computer hardware. Accordingly, in some implementations output device 210 displays a user interface. In other implementations, output device 210 may be a speaker configured to output audible information to the user. In still other implementations, any combination of output devices may be represented by the output device 210.

Network interface 220 provides the computer system 200 with connectivity to the network 226 through any compatible communications protocol. Network interface 220 sends and/or receives data from the network 226 via a wireless or wired transceiver 214. Transceiver 214 may be a cellular frequency, radio frequency (RF), infrared (IR) or any of a number of known wireless or wired transmission systems capable of communicating with network 226 or other computer device having some or all of the features of computer system 200. Bus 208 may represent one or more busses, e.g., USB, PCI, ISA (Industry Standard Architecture), X-Bus, EISA (Extended Industry Standard Architecture), or any other appropriate bus and/or bridge (also called a bus controller). Network interface 220 as illustrated in FIG. 2 may be representative of a single network interface card configured to communicate with one or more different data sources.

Computer system 200 may be implemented using any suitable hardware and/or software, such as a personal computer or other electronic computing device. In addition, computer system 200 may also be a portable computer, laptop, tablet or notebook computer, PDA, pocket computer, appliance, telephone, server computer device, or mainframe computer.

As discussed above, one function performed by the system may comprise route planning, such as via route planning circuitry 153. In one implementation, the carrier may input one or more of the parameters. In response, the system may generate a proposed route for the carrier to follow. Examples of parameters include (but are not limited to): time (e.g., carrier will travel for 1 week); starting location; ending location; distance traveled (e.g., carrier is willing to travel 1,000 to 1,500 miles); geographic area (e.g., carrier is willing to travel in the following regions (or states)); number of stops to pick up and/or drop off; preference (e.g., maximize profit; minimize distance driven; minimize time driven (e.g., total number of driving hours in a week)). The parameters are for illustration purposes; other parameters are contemplated.

The route planning may be performed in real-time (e.g., carrier indicates a readiness to begin driving route immediately). Alternatively, the route planning may be performed for a start at a future time (e.g., carrier indicates that the beginning time for the route is in 1 week).

Further, the route planning circuitry 153 may generate one or more routes and information regarding the route. The information may comprise general information about the route as a whole and specific information as to one or more stops along the route. For example, the generate information may include costs associated with the route, such as time costs (e.g., total time on each of the proposed routes), distance costs (e.g., total distance on each of the proposed routes), monetary costs (e.g., gasoline costs, toll costs, and/or wear-and-tear costs). As another example, the specific information may include the address of the stop, the items for pickup at the stop, etc.

The output for the route planning may be in one of several forms. As one example, the output may comprise a listing or show graphically where the route is, where will stop. The GUI may detail a variety of potential routes, such as highlighting the different routes in different colors. Optionally, in addition, the listing or graphic may show multiple stops and associated information, such as stop #1 (pick up two cars at 8 am on Jun. 15, 2016); stop #2, etc. In the instance of a graphic, in one implementation, user input may trigger display of the associated information. For example, the user may hover over and/or click on an icon or indicator of a stop along the route. In response to hovering and/or clicking, the associated information is output (e.g., displayed alongside the icon).

Figure 3:
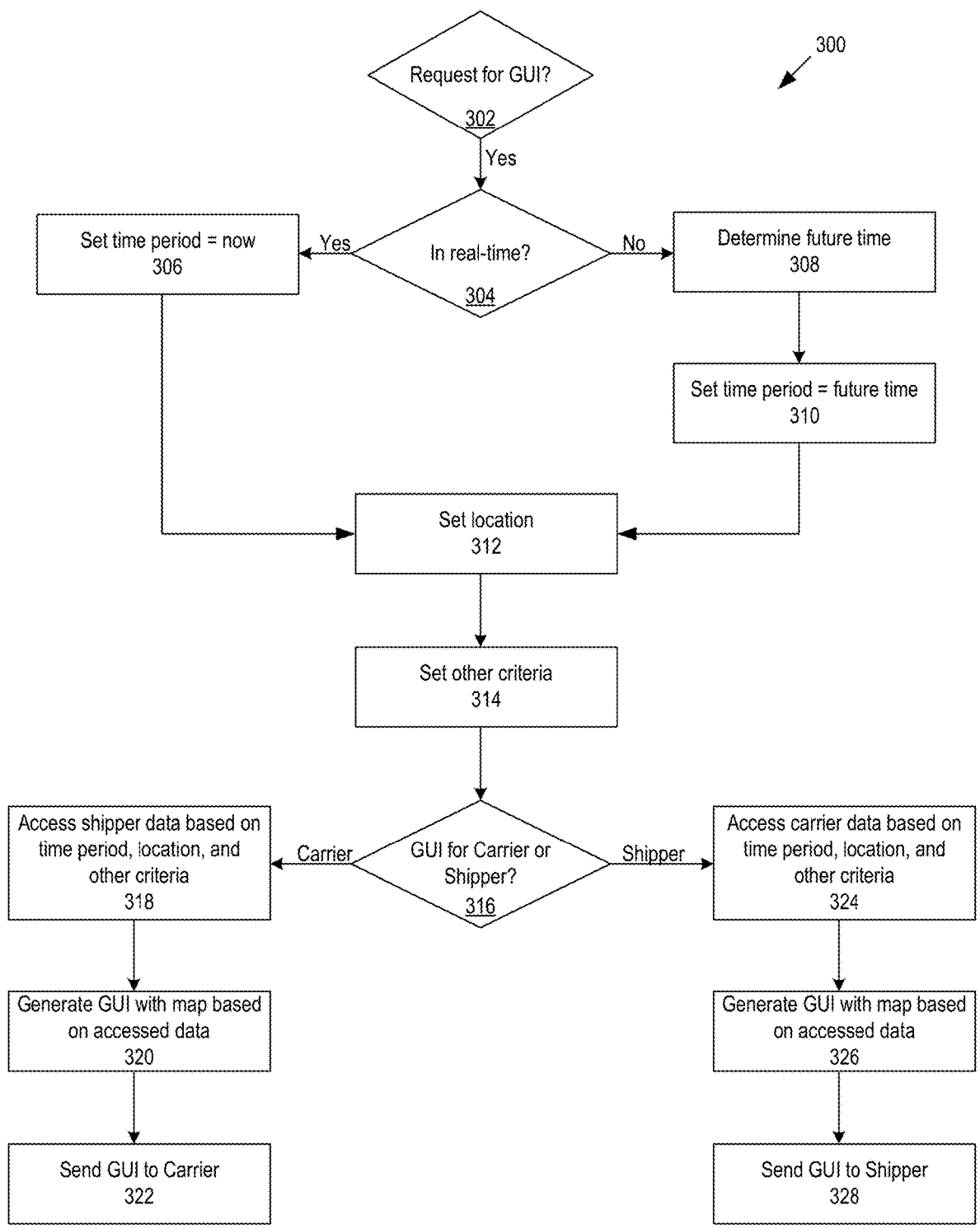
FIG. 3 illustrates an exemplary flow diagram of logic that may be implemented by the exemplary communication system for generating a graphical user interface (GUI).

FIG. 3 illustrates an exemplary flow diagram 300 of logic that may be implemented by the exemplary communication system for generating a graphical user interface (GUI). As discussed above, one or more GUIs may be generated and sent to the carrier and/or the shipper. At 302, it is determined whether there is a request for a GUI. If so, at 304, it is determined whether the request is for a real-time determination of a GUI or for a future time. If the determination is for real-time, at 306, the time period is set for "now". If the determination is for a future time, at 308, the future time is determined, and at 310, the time period is set for the determined "future time". The time period may be determined in one of several ways. In one way, the system may determine the time period based on the request for the GUI. For example, a particular carrier may send a request for shippers in the local area for real-time pick-up. In this regard, the system may, in processing the request, determine that the time period is real-time. As another example, a particular shipper may send a request for carriers for pick-up in 3 days time for delivery to a defined destination. In this way, the system may, in processing the request, determine that the time period is in 3 days. In another way, the system may determine the time period to generate the GUI separate from the request. For example, the carrier or shipper may have a profile that defines the time period for generating the GUI. Thus, responsive to the request, the system may access the profile for the time period when generating the GUI.

At 312, the location is set. The location is one of the criteria used for searching database 160. Similar to the time period, the location may be determined in one of several ways. In one way, the system may determine the time period based on the request for the GUI. For example, a particular carrier may send, via its associated electronic device, a request for shippers in the local area and a current location of the particular carrier, based on a GPS receiver resident in the associated electronic device. In another way, the system may determine the location separate from the request. For example, the shipper may have a profile that defines the location associated with the shipper.

At 314, one or more other criteria for searching may be set. As discussed above, a shipper and/or a carrier may input: capacity information; and pricing information. At 316, it is determined, such as based on the request, whether the GUI is for a shipper or carrier. If the GUI is for a carrier, at 318, perform a search, based on the various criteria (e.g., time period, location, etc.), of database 160 in order to access shipper data (which in turn may be used to select a subset of shippers (from the set of shippers) that meet the various criteria). At 320, the accessed data is used to generate a GUI (such as illustrated in FIG. 6), and at 322, the GUI is sent to the carrier. If the GUI is for a shipper, at 324, perform a search, based on the various criteria (e.g., time period, location, etc.), of database 160 in order to access carrier data (which in turn may be used to select a subset of carriers (from the set of carriers) that meet the various criteria). At 326, the accessed data is used to generate a GUI (such as illustrated in FIG. 6), and at 328, the GUI is sent to the shipper.

Figure 4:
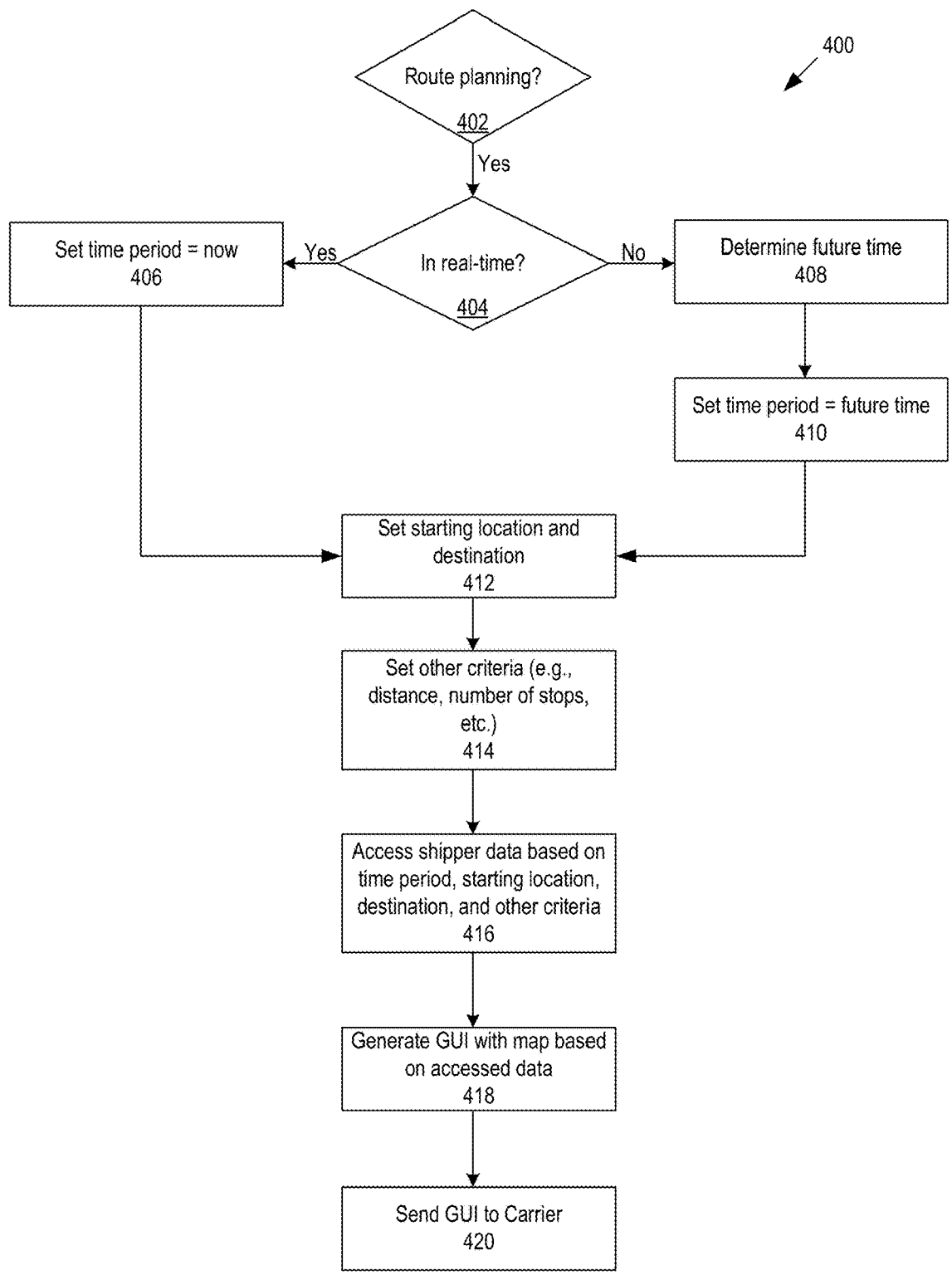
FIG. 4 illustrates an exemplary flow diagram of logic that may be implemented by the exemplary communication system for planning a route of a carrier.

FIG. 4 illustrates an exemplary flow diagram 400 of logic that may be implemented by the exemplary communication system for planning a route of a carrier. At 402, it is determined whether there is a request for route planning. If so, at 404, it is determined whether the request is for a real-time determination of a route or for a future time. If the determination is for real-time, at 406, the time period is set for "now". If the determination is for a future time, at 408, the future time is determined, and at 410, the time period is set for the determined "future time". Similar to determining the time period for the GUI, the time period for the route may be determined in one of several ways, including based on the request and based on a profile.

At 412, the starting location and destination are set. The starting location and destination may be included in the request for route planning from the carrier. Alternatively, the starting location and destination may be included in a profile associated with the carrier. At 414, various other criteria (such as distance, number of stops, etc.) may be set as well. At 416, a search of database 160 is performed based on the various criteria in order to access shipper data. At 418, the accessed data is used to generate a GUI, and at 420, the GUI is sent to the carrier.

Figure 5A:
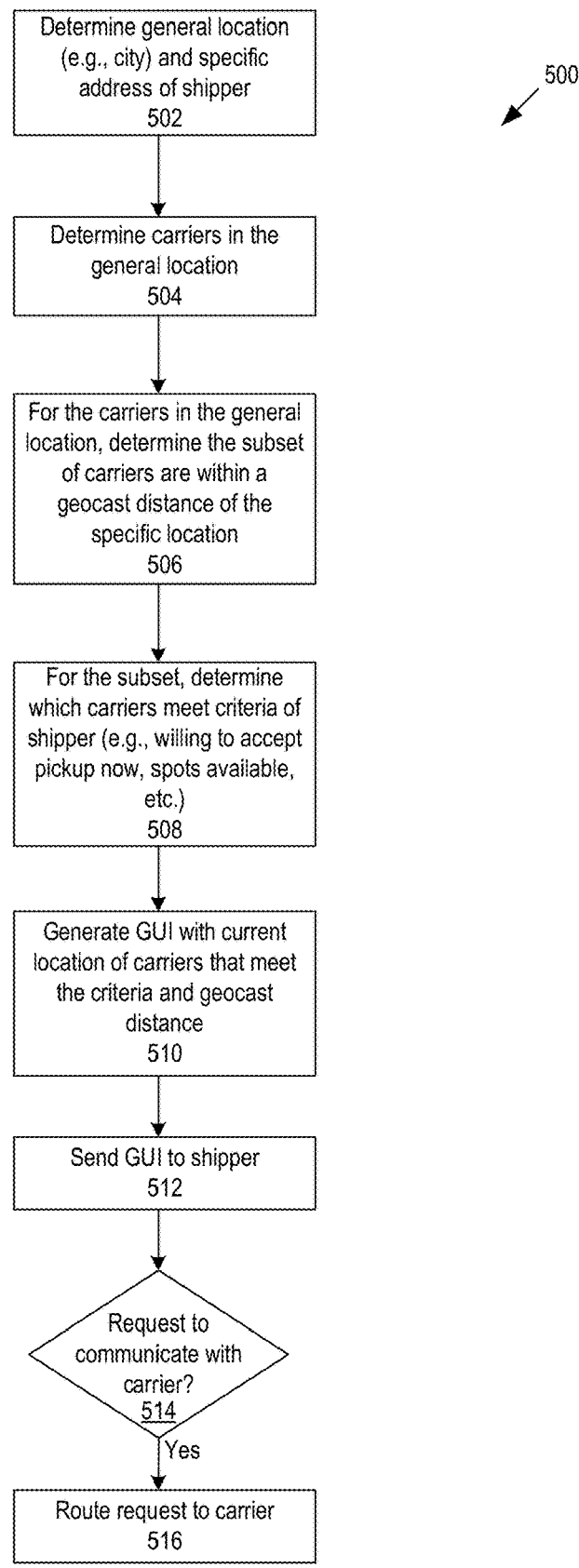
FIG. 5A illustrates an exemplary flow diagram of logic that may be implemented by the exemplary communication system for generating a GUI for a shipper based on geo-fence distance.

As discussed above, a geo-fence may be used to generate a GUI and/or trigger a geo-cast communication. FIG. 5A illustrates an exemplary flow diagram 500 of logic that may be implemented by the exemplary communication system for generating a GUI for a shipper based on geo-fence distance. At 502, the general location (e.g., city) and/or specific address of a shipper is determined. At 504, the carriers in the general location are determined. At 506, the system determines, for the carriers in the general location, the subset of carriers that are within a predetermined distance (e.g., a geocast distance) of the specific location. At 508, for the subset of carriers determined in 506, the system determines which carriers meet the criteria of the shipper (e.g., willing to accept a pickup now, spots available, etc.). At 510, a GUI is generated with the current location of the carriers in the subset. At 512, the GUI is sent to the shipper.

At 514, it is determined whether the shipper has sent a request to communicate with a carrier. For example, the GUI may allow for a shipper to click on the icon associated with a particular carrier, with the click resulting in the electronic device of the shipper sending a request to communicate with the particular carrier. Responsive to the request, at 516, the request is routed to the carrier.

Figure 5B:
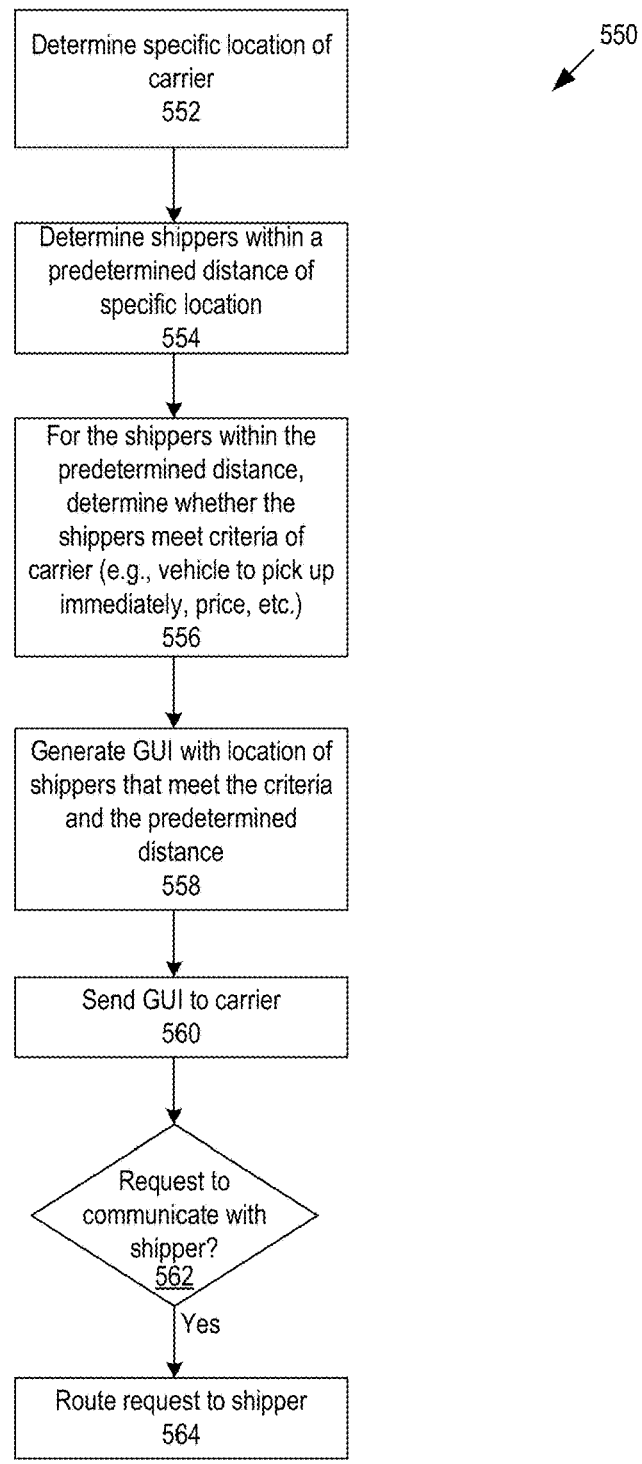
FIG. 5B illustrates an exemplary flow diagram of logic that may be implemented by the exemplary communication system for generating a GUI for a carrier based on geo-fence distance.

FIG. 5B illustrates an exemplary flow diagram 550 of logic that may be implemented by the exemplary communication system for generating a GUI for a carrier based on geo-fence distance. At 552, the specific location of the carrier may be determined by the system. In one example, the system may poll the carrier. In response, the carrier may send its current location using GPS device 137. Alternatively, the carrier may send, unprompted, its current location periodically.

At 554, the system may determine shippers within a predetermined distance of the specific location of the carrier. At 556, the system may then determine which shippers, from the set of shippers determined at 554, meet one or more criteria of the carrier. As discussed above, the carrier may set various criteria, such as time for pickup, pricing, or the like. At 558, the system may then generate a GUI with the location of the shippers determined at 556. The location of the shippers in the GUI may be identified by icons. Further, in one implementation, the GUI may include information in addition to the icons, such as pricing information. At 560, the system sends the GUI to the carrier. At 562, the system determines whether the carriers requests to communicate with the shipper. If so, at 564, the request is routed to the shipper.

As discussed above, maps may be used to display one or both of capacity or demand. In one implementation, a first type of GUI may map the capacity of carriers. In particular, a shipper may request all of the carriers that are currently available to accept shipments. In another implementation, a second type of GUI may map the demand of shippers. In particular, a carrier may request all of the shippers that are currently requesting shipment of goods. In still another implementation, a third type of may map the capacity of carriers and the demand of shippers.

FIG. 6 illustrates an exemplary GUI 600 showing shippers, carriers and geo-fence distance. Thus, GUI 600 illustrates both capacity of carriers and demand of shippers. Alternatively, a GUI may include only one of capacity or demand.

GUI 600 includes a map, with icons superimposed thereon. For example, squares illustrate dealers and circles illustrate truckers. In addition, the GUI 600 includes additional information. In one implementation, the additional information may be accessed by user input, such as by clicking or hovering over an icon. In this regard, the additional information may more easily be accessed from the GUI 600. For truckers, the information may comprise whether the trucker is available, the number of spaces, and the heading. For dealers, the information may comprise the goods for pickup (e.g., Ford Explorer), the destination, and the price offered for delivery. This information is simply for illustration purposes. In an alternate implementation, the additional information may be part of or superimposed on the icon. For example, the amount of goods for shipment may be superimposed on the square icon (representing dealers) or the amount of capacity to ship may be superimposed on the circle icon (representing truckers). Thus, in one specific example, the number "25" may be superimposed onto the dot of the shipper to signify the number of cars that the shipper needs shipped. This number may be present on the GUI without any action. Thus, in one implementation, the additional information is displayed on the GUI without additional action by the user.

The GUI 600 may further facilitate communication between the carriers and shippers. As discussed above, clicking on or hovering over an icon may trigger display of the additional information. The additional information may further include a field in which to input text. After inputting the text, the user may activate the mouse to send a communication that includes the input text. Alternatively, the user may drag and drop an icon into the carrier's "basket", thereby triggering a communication from the carrier to the electronic device associated with the icon. In this regard, user input on the GUI may trigger activation of a communication application on the electronic device associated with the carrier or shipper.

Likewise, receipt of a communication may change or amend the GUI 600. As one example, a specific carrier may have in the GUI different shippers indicated via icons. When a communication, such as a text, is received by the electronic device associated the specific carrier, the receipt of the text may trigger output of the content of part or all of the text on the GUI. In particular, the content of part or all of the communication may be represented by a window on, an overlay on, or a modification of the GUI. The size and/or placement of the window, overlay, or modification may be associated with the icon from the party who sent the communication. For example, receipt of a text will result in display of the content of the text alongside the icon that represents the party that sent the text (e.g., a pop-up window on top of or a bubble included in the GUI 600). A bubble of the Dealer #1 texts is illustrated in a bubble included in the GUI 600. As shown, Dealer #1 sent a text to a trucker, with an offer. In response, the trucker sent an offer via text.

The display of content of the text may be removed from the GUI in one of several ways. In one way, a user input, such as closing the pop-up window, results in the displayed content being removed. In another way, the content is displayed for a predetermined amount of time. If, after the predetermined amount of time there is no input, the displayed content is removed.

As discussed above, the GUI may be generated in response to a carrier or shipper search request. For example, a shipper may request any one of the following questions: when is the next truck leaving town; show me all of the trucks near me; show me all the trucks that are travelling to a specific destination; show me all of the trucks that are going to be landing 3 days from now and can I leverage those spaces (reserve those spaces for me); show me all carriers currently in a specific area (e.g., College Park, MD); show me the real-time locations of all carriers in the specific area (e.g., College Park, MD); show me the home location (not necessarily the real-time location) of all carriers that have registered and have indicated that they are ready to pick-up; show me all carriers that have a predetermined amount of space for transporting (e.g., 4 or more vehicle spaces for pickup). As discussed above, the maps generated and output via the GUI may indicate real-time information or information for a predetermined time in the future.

Similarly, carriers may input one or more criteria for to generate a GUI including: show me all shippers in a specific area (e.g., College Park, MD) that need a pickup right now; show me all shippers that have at least a predetermined amount of goods for pickup (e.g., 4 or more cars for pickup); show me all shippers that have a vehicle that has a destination along the way to a specific destination (e.g., a destination along the way to Phoenix, AZ).

In practice, a carrier, such as a trucker, may log-on to request a map indicating the trucker's position in relation to various shippers in the area. In this regard, the trucker may input one or more criteria to select a subset of shippers displayed on the GUI. In one implementation, the GUI may output carriers and shippers regardless of the direction of the carriers. For example, a respective carrier may be illustrated (with potentially a geo-fence) if the respective carrier is within a predetermined distance from the shipper (e.g., within the geo-fence) regardless of direction of the respective carrier. In an alternate implementation, the GUI may output carriers and shippers, accounting for the direction of the carriers. For example, a respective carrier may be illustrated (with potentially a geo-fence) if the respective carrier is within a predetermined distance from the shipper (e.g., within the geo-fence) and the heading of the respective carrier is in the direction of the shipper (e.g., is within a predetermined distance of a road on which the respective carrier is travelling).

As discussed above, the various criteria may include: pick-up location (e.g., show me dealers who need a pickup in a particular city (or 20 miles around my current location); drop-off location (e.g., show me dealers who need to deliver to "X" location); time (e.g., show me dealers who need pick-up and/or delivery at a certain time in the future); number of spots (e.g., how many vehicles does the dealer need to move); type of vehicles (e.g., the types of vehicles that the dealer needs to deliver); pricing (e.g., sell for $X/mile; or for a first distance range, such as less than 100 miles, charge $A/mile; for a second distance range (e.g., 100-200 miles), charge $B/mile, etc.) etc. Other criteria may be configured. For example, the distance of the geo-fence may be configurable. As discussed above, the geo-fence may be used to push communications to a carrier. In one implementation, the distance of the geo-fence may be pre-determined and non-changeable. In an alternate implementation, the distance of the geo-fence may be changeable, such as by user input. For example, the distance of the geo-fence may vary based on the offer of shipper of payment of the transport of the goods (e.g., increase the distance of the geo-fence to 20 miles if the offer is over $X and decrease the distance of the geo-fence to 10 miles if the offer is under $X) and/or based on the amount of goods for transport (e.g., increase the distance of the geo-fence to 20 miles if the offer is to transport 4 or more vehicles and decrease the distance of the geo-fence to 10 miles if the offer is to transport less than 4 vehicles).

The trucker may set up a profile, which may later be used as the criteria for searching. As part of the profile, the system may request whether the carrier wishes to be included in results from searches submitted by shippers. In this regard, the carrier may indicate when it wishes to transport goods responsive to searches for real-time pickups.

Likewise, a shipper, such as a dealer, may log-on to request a map indicating the dealer's position in relation to various truckers in the area. In one implementation, the shipper can view, via the GUI, carriers that are ready for pickup. Further, search criteria for the dealer may include, but is not limited to: pick-up location (e.g., show me truckers who can pick up in a particular city (default may be current dealer location)); drop-off location (e.g., show me truckers who are driving to "X"); time (e.g., show me truckers who can pick-up and/or deliver at a certain time in the future); number of spots (e.g., show me carriers that can pick up 4 or more vehicles); or type of vehicles (e.g., the types of vehicles the trucker can accept).

Though the GUI 600 in FIG. 6 is directed to carriers and shippers, other types of GUIs are contemplated. As one example, the GUI may represent include icons of tow trucks in a particular area. In this way, a stranded driver or a dispatcher may readily view the tow trucks in the particular area. For example, the dispatcher may receive a GUI that shows all of the available tow-truck drivers in the area. As another example, the stranded driver may receive a GUI that shows where the contracted tow-truck driver is. Thus, the stranded driver may view the distance (or time) until the tow-truck arrives.

Figure 7A:
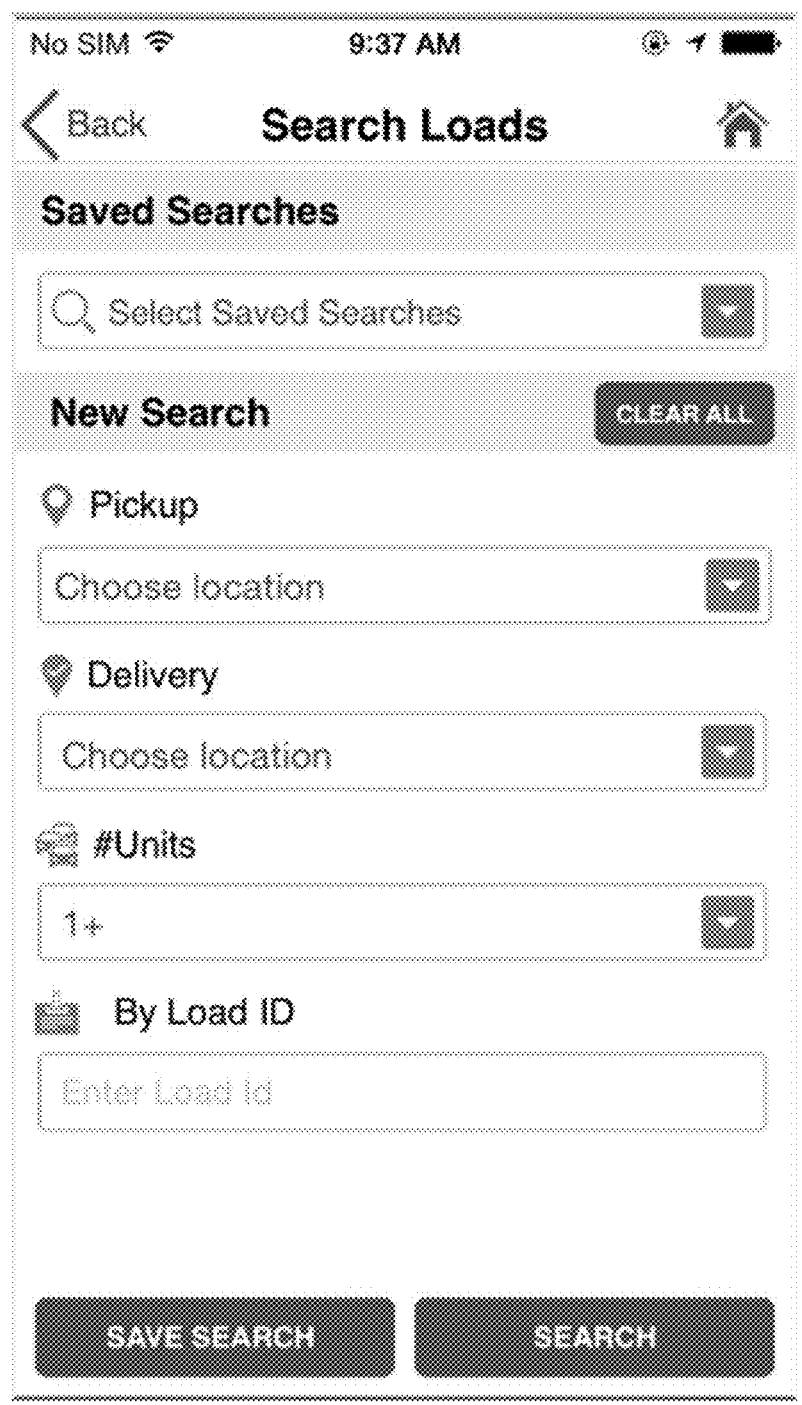

FIGS. 7A-D illustrates exemplary user interfaces for inputting search criteria, receiving search results, and accepting transportation of a load. In particular, FIG. 7A illustrates a GUI 700 that includes various search criteria in which to search for carriers. The search criteria illustrated in GUI 700 includes: pickup location; deliver location; number of units to deliver; and load identification. Other search criteria are contemplated.

Figure 7B:
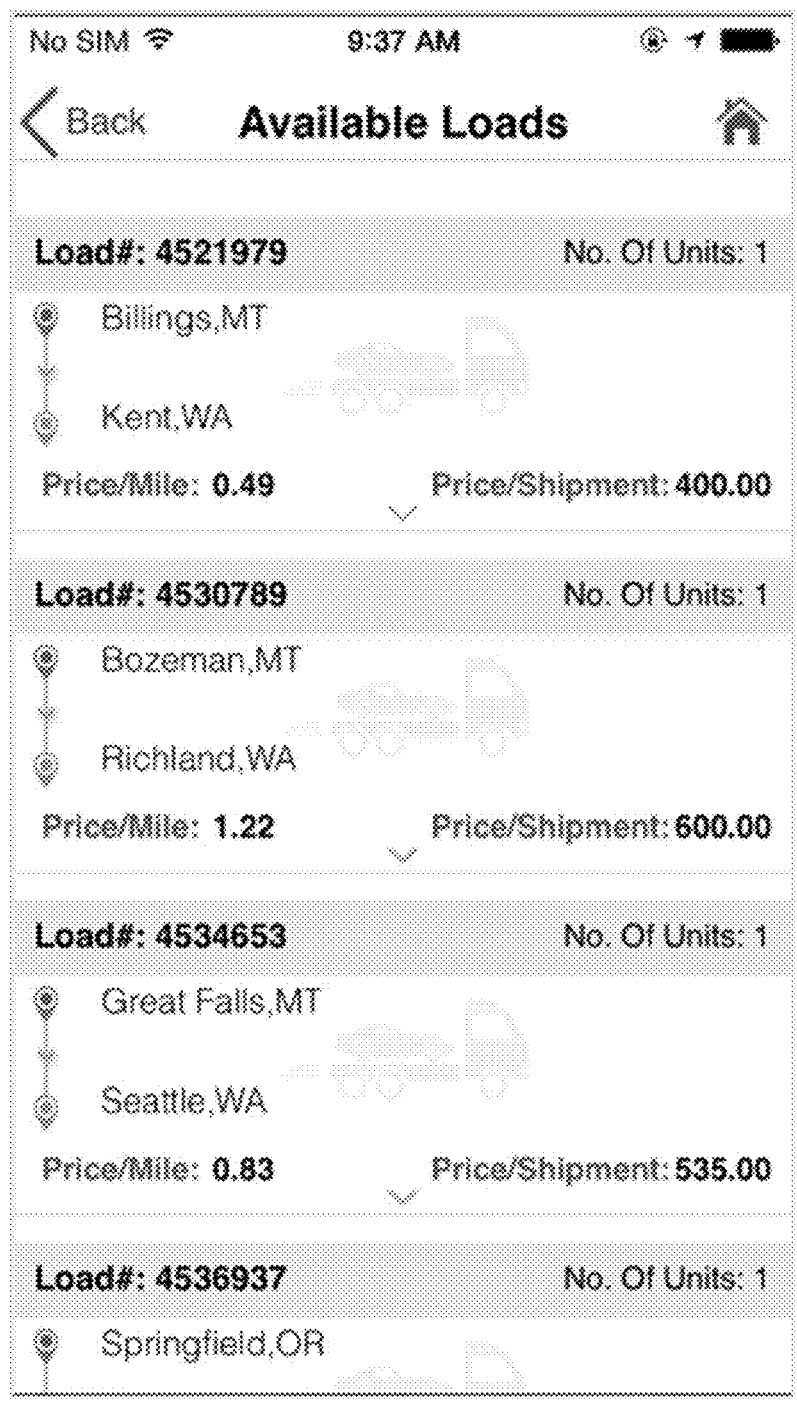

FIG. 7B illustrates a GUI 720 listing the results of a search. In particular, GUI 720 lists loads (and associated information) that meet the search criteria. As shown, the associated information includes the load number, the route, the number of units, the price/mile and the price for the shipment. Other associated information is contemplated.

Figure 7C:
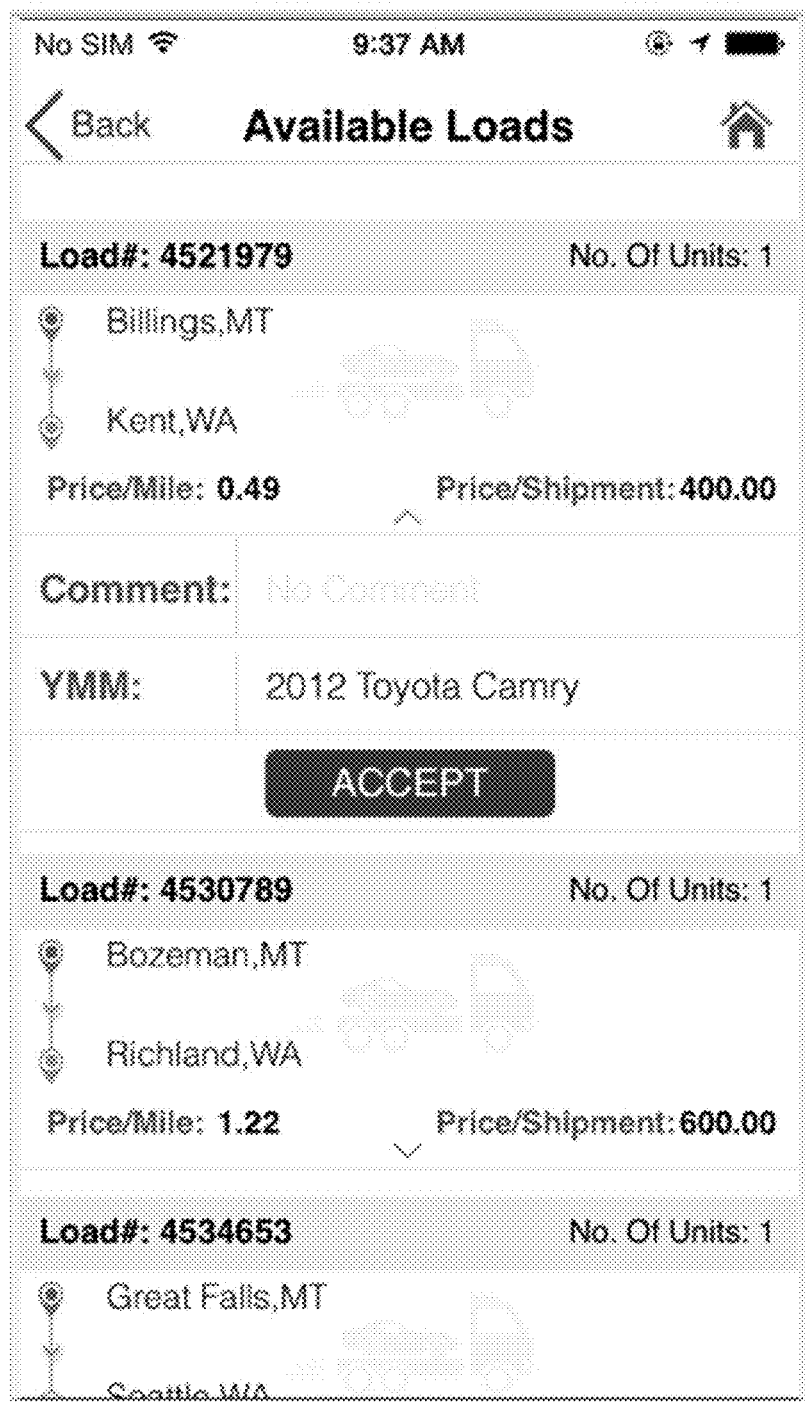

FIG. 7C illustrates a GUI 740 that list potential communications with a shipper. Clicking on load #4521979 in FIG. 7B results in GUI 740, which includes additional information, such as the type of goods (2012 Toyota Camry), a comment and an "ACCEPT" button. In response to activating the "ACCEPT" button, the user may be taken to the GUI 760 illustrated in FIG. 7D. In particular, the driver may enter various details, such as name, contact information (e.g., email or fax), pickup date, delivery date and payment type.

Figure 8A:
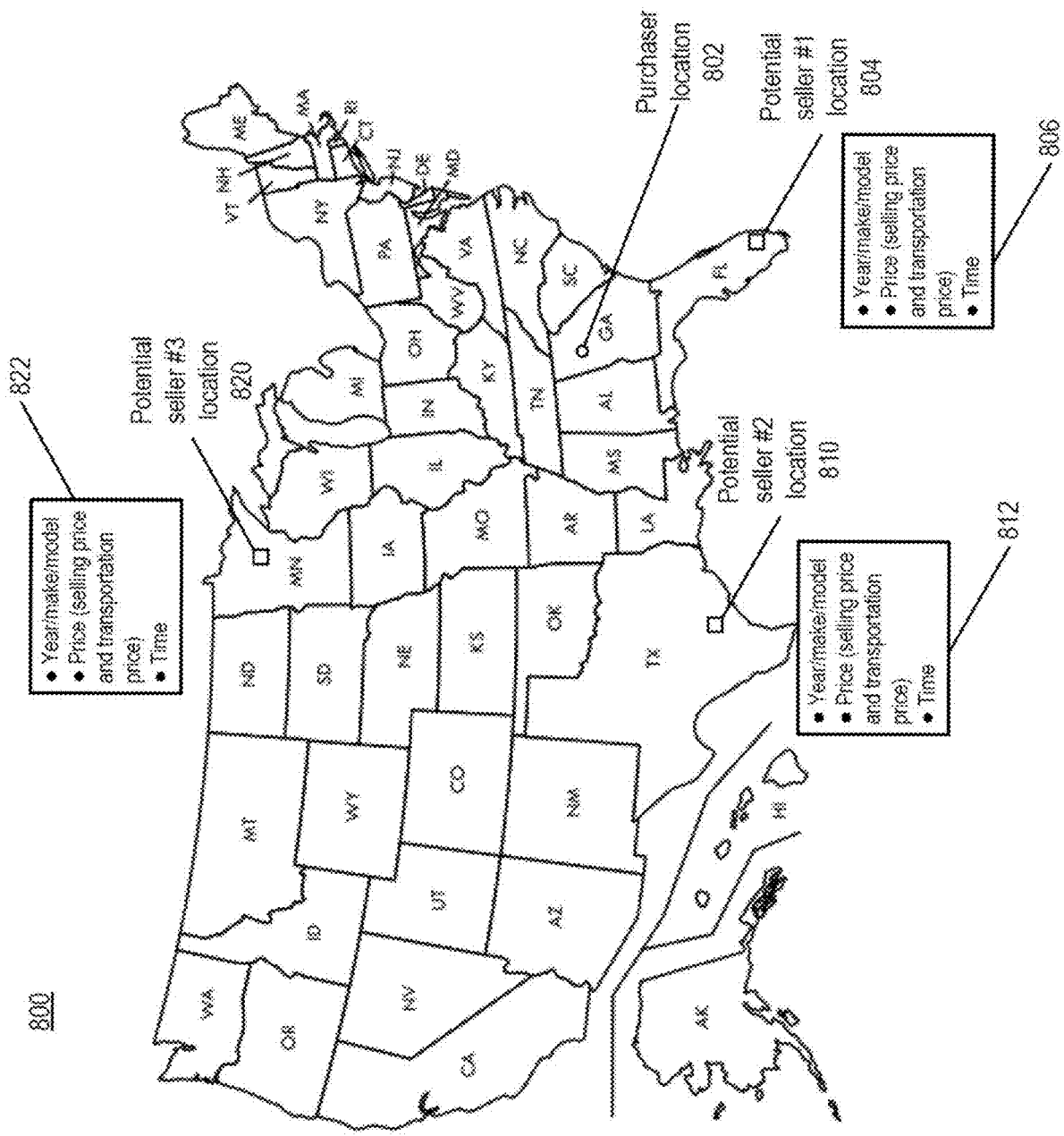
FIG. 8A illustrates an exemplary GUI showing a purchaser location and potential seller locations.

As discussed above, the methodology may be used for a seller of a vehicle or a purchaser of a vehicle. FIG. 8A illustrates an exemplary GUI 800 showing a purchaser location 802 and potential seller locations (e.g., potential seller #1 location 804, potential seller #2 location 810, and potential seller #3 location 820). A purchaser of a vehicle may enter vehicle criteria to identify a vehicle (e.g., any one, any combination, or all of: a year or a range of years of the vehicle, a vehicle manufacturer, a model, mileage of vehicle, options, selling price, etc.). Also, the purchaser may enter shipping criteria to indicate the details of shipping (e.g., any one, any combination, or all of: an amount of time to ship vehicle, a cost to ship the vehicle, etc.). Further, the purchaser may enter common criteria, such as total price (e.g., selling price and transportation price). Responsive to the entered criteria, the system may determine potential sellers (which match the criteria entered) and generate a GUI of the potential sellers, such as illustrated in FIG. 8A. For example, the system may determine a list of potential vehicles that meet the selling pricing criteria, the year/make/model criteria, or the like. After which, the system may determine the transportation cost for each of the vehicles in the list of potential vehicles, in order to generate the total price. As discussed further below, the system may determine the transportation cost in one of several ways. The list of potential sellers may then be represented in GUI 800 as shown in FIG. 8A.

The GUI 800 may include additional information 806, 812, 822 associated with the different potential sellers, such as any one, any combination, or all of the following: year/make/model of the vehicle; price (e.g., total cost including selling price and transportation price); and time until receipt of the vehicle). The additional information may be output without any action by the purchaser. Alternatively, the additional information may be visible when the purchaser hovers a mouse over the icon associated with the potential seller or clicks on the icon associated with the potential seller. Though not shown, the criteria may be delineated or adjusted based on input from the purchaser. For example, sliders may be used to input the various criteria, such as a slider for timing (from NOW to 1 week from now), a slider for price, and/or a slider for distance (from 0 miles to 500 miles).

In one implementation, the GUI 800 may be generated and the purchaser may communicate with the potential sellers. For example, the purchaser may click on an icon for a particular potential seller, resulting in the purchaser device sending the device ID of the purchaser and an indication that the purchaser wants to communicate with the particular potential seller associated with the clicked icon. The server may then access a lookup table, using information associated with the particular potential seller, to determine the communication address associated with the particular potential seller, and then send a communication to the communication address associated with the particular potential seller. The communication may comprise an acceptance of the terms. Alternatively, the communication may comprise a counter-offer, such as a request for lowering of the price (e.g., the selling price) and/or a change in the time of shipment (e.g., a reduction in the amount of time to ship the vehicle).

As discussed above, the transportation cost may be determined in one of several ways. In one way, the system may determine the transportation cost by using an index pricing model. In another way, the system may determine the transportation cost by using the methodology discussed above, such as GUI illustrated in FIG. 6. For example, the system may: receive respective locations of potential carriers of the respective vehicle; access, from the database, the capacity of the potential carriers to carry the respective vehicle; determine, based on the respective locations of the potential carriers and the accessed capacity of the potential carriers to carry the respective vehicle, a subset of potential carriers that have capacity to carry the respective vehicle and are within a predetermined distance of the respective seller location; and send a communication to one or both of the subset of potential carriers or the respective seller, the communication indicative of notifying of a potential transport of the respective vehicle. The communication may comprise the GUI illustrated in FIG. 6. Using the GUI illustrated in FIG. 6, bids from the respective seller or the potential carriers may be input, and based on an agreement between the respective seller and a potential carrier as to the transportation cost and/or based on a bid from one of the respective seller or the potential carrier, the system may determine the transportation cost. In this way, multiple levels of GUIs may be used (such as GUIs in FIGS. 6 and 8A).

Thus, as shown in FIG. 8A, prices may be used at different stages including: (1) which potential sellers to include in the GUI; and (2) the prices listed in the GUI. As discussed above, transportation prices may be determined in one of several ways. In one way, the transportation price may be determined by an index pricing model. In a second way, the transportation price may be determined based on a bid (such as a bid from a potential seller in FIG. 8A or a bid from a potential buyer in FIG. 8B). In a third way, the system may use the methodology illustrated above (e.g., FIG. 6) in which carriers submit bids for transport. Typically, the purchase price of the vehicle is readily available. However, the landed price, which includes the price of the vehicle and the cost of transportation, is not typically available. In determining the landed price, the system may access the purchase prices for a set of vehicles that meet the purchaser's criteria, may determine the transportation cost for each of the vehicles in the set of vehicles (e.g., via the index pricing model, via transportation bids from the seller, or via transportation bids from a carrier), and may determine the total price (including the price of the vehicle and the cost of transportation). In this regard, the total price (including the purchase price and the transportation cost) may be used in order to determine which vehicles to present to the purchaser.

Figure 8B:
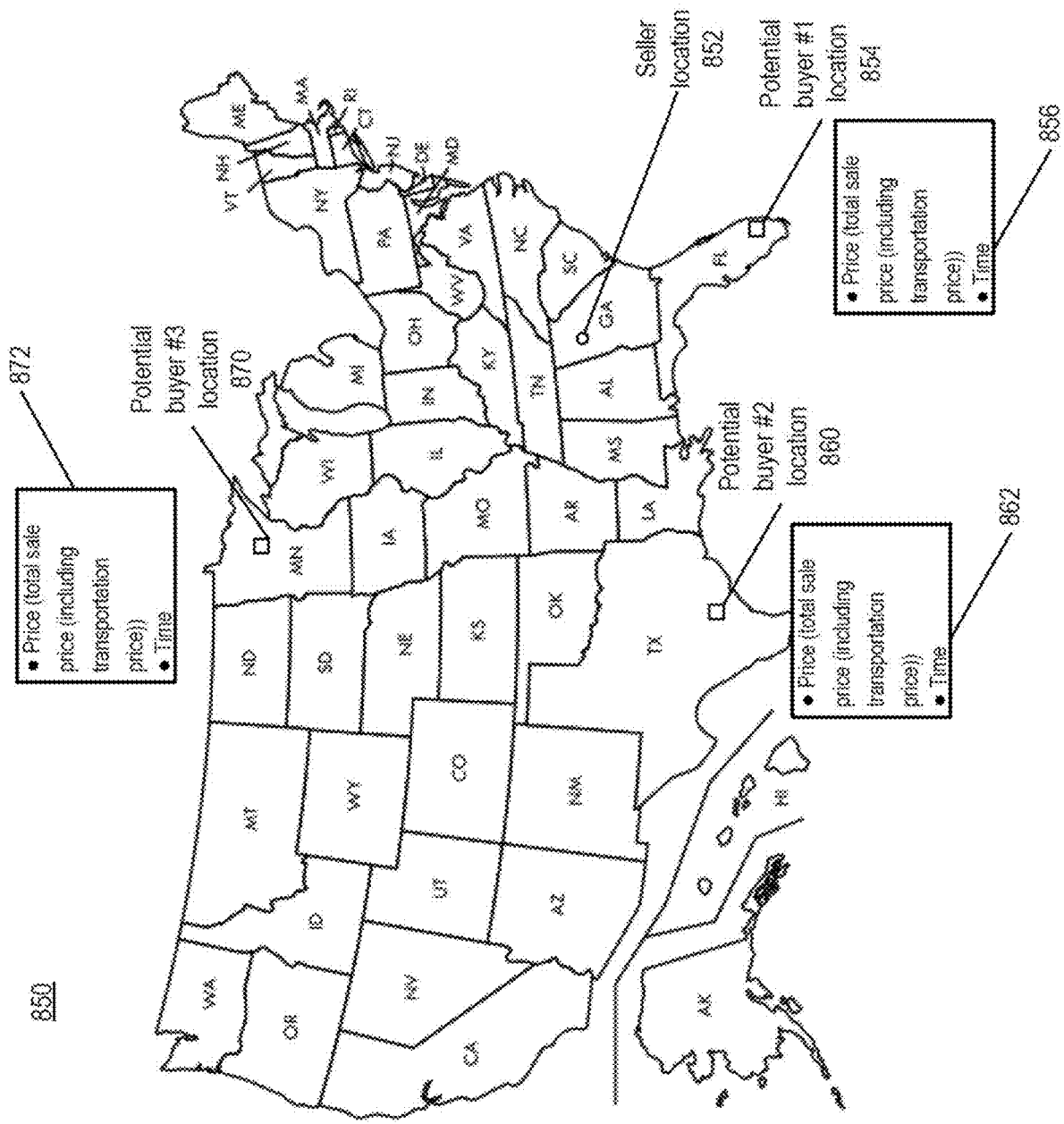
FIG. 8B illustrates an exemplary GUI showing a seller location and potential buyer locations.

FIG. 8B illustrates an exemplary GUI 850 showing a seller location 852 and potential buyer locations (e.g., potential buyer #1 location 854, potential buyer #2 location 860, and potential buyer #3 location 870). A seller of a vehicle may enter vehicle criteria (e.g., any one, any combination, or all of: a year or a range of years, a vehicle manufacturer, a model, mileage of vehicle, options, cost, etc.). Also, the seller may enter shipping criteria to indicate the details of shipping (e.g., any one, any combination, or all of: an amount of time to ship vehicle, a cost to ship the vehicle, etc.). Further, the seller may enter common criteria, such as total price (e.g., selling price and transportation price). Responsive to the entered criteria, the system may determine potential buyers (which may match the criteria entered) and generate a GUI of the potential buyers, such as illustrated in FIG. 8B. For example, the system may determine a list of potential vehicles that meet the purchase pricing criteria, the year/make/model criteria, or the like. After which, the system may determine the transportation cost for each of the vehicles in the list of potential vehicles, in order to generate the total price. As discussed further below, the system may determine the transportation cost in one of several ways. The list of potential sellers may then be represented in GUI 850 as shown in FIG. 8B.

The GUI 850 may include additional information 856, 862, 872 associated with the different potential buyers, such as any one, any combination, or all of the following: price (e.g., total cost including selling price and transportation price); and time until receipt of the vehicle). The additional information may be output without any action by the seller. Alternatively, the additional information may be visible when the seller hovers a mouse over the icon associated with the potential buyer or clicks on the icon associated with the potential buyer. Though not shown, the criteria may be delineated or adjusted based on input from the seller. For example, sliders may be used to input the various criteria, such as a slider for timing (from NOW to 1 week from now), a slider for price, and/or a slider for distance (from 0 miles to 500 miles).

In one implementation, the GUI 850 may be generated and the seller may communicate with the potential buyers. For example, the seller may click on an icon for a particular potential buyer, resulting in the seller device sending the device ID of the seller and an indication that the seller wants to communicate with the particular potential buyer associated with the clicked icon. The server may then access a lookup table, using information associated with the particular potential buyer, to determine the communication address associated with the particular potential buyer, and then send a communication to the communication address associated with the particular potential buyer. The communication may comprise an acceptance of the terms. Alternatively, the communication may comprise a counter-offer, such as a request for increasing of the price (e.g., the purchase price) and/or a change in the time of shipment (e.g., an increase in the amount of time to ship the vehicle).

In addition, the transportation cost may be determined in one of several ways, as discussed above. In a first way, the system may determine the transportation cost by using an index pricing model. In a second way, the system may determine the transportation cost by using the methodology discussed above, such as GUI illustrated in FIG. 6. For example, the system may: receive the request from an electronic device; determine a location associated with the seller; select, based on the purchaser information, a set of potential purchasers of the vehicle; determine, for each of the potential purchasers in the set of potential purchasers, transportation cost associated with transporting the vehicle from the location associated with the seller to a location associated with a respective potential purchaser; generate a graphical user interface (GUI) based on the set of potential purchasers, the GUI including icons associated with locations of respective potential purchasers in the set of potential purchasers and including additional information associated with the icons, the additional information for a respective icon output in response to user input on or near to the respective icon, wherein the addition information for the respective icon indicative of the transportation cost associated with transporting the vehicle from the location associated with the seller to the location associated with the respective potential purchaser; and sending the GUI to the electronic device. The communication may comprise the GUI illustrated in FIG. 6. Using the GUI illustrated in FIG. 6, bids from the seller or the potential carriers may be input, and based on an agreement between the seller and a potential carrier as to the transportation cost and/or based on a bid from one of the seller or the potential carrier, the system may determine the transportation cost. In this way, multiple levels of GUIs may be used (such as GUIs in FIGS. 6 and 8B).

Further, as discussed with reference to FIG. 8A, prices may be used at different stages including: (1) which potential buyers to include in the GUI illustrated in FIG. 8B; and (2) the prices listed in the GUI illustrated in FIG. 8B.

Other uses of the index pricing model are contemplated. As discussed above, the platform, such as application server 140, may be configured to facilitate connecting a shipper with a carrier. Typically, there is a price at which the shipper and the carrier will agree to the transaction. However, several constraints act as a barrier to agreeing to the transaction. Constraints include any one, any combination, or all of: the logistics of providing information to and a communication platform for the shipper and the carrier to communicate; the nature of carriers and shippers potentially being geographically remote from one another (with the carriers typically being mobile); and the rigid nature of typical negotiations between carriers and shippers. In one implementation, the platform leverages as much information as is available in order to generate outputs, including communications, GUIs, and the like, in order to facilitate the agreement to the transaction.

FIGS. 9A-D are example block diagrams 900, 920, 940, 960 of different combinations of available information from the shippers (e.g., shipper #1 (902) . . . shipper #N (904)) and carriers (e.g., carrier #1 (906) . . . carrier #M (908)) when interacting with application server 910 (such as application server 140).

Available information for the shippers may include any one, any combination, or all of: price (such as a maximum price or a price range the respective shipper willing to pay to ship a respective vehicle); timing (e.g., a date by which the respective vehicle must be picked up or delivered or a date range in which the respective vehicle is to be delivered); vehicle for transport (e.g., the type of vehicle (e.g., compact car, SUV), the make/model of the vehicle, or the like to provide the carrier an indication of the transport requirements); destination (e.g., the address, city or state where the respective vehicle is to be transported); or special considerations (e.g., the number of vehicles the shipper needs shipped).

Available information for the carriers may include any one, any combination, or all of: price (e.g., what price, price range, or price/mile the respective carrier is willing to accept); timing (e.g., when the respective carrier is able to transport the vehicle); vehicle transporting capabilities (e.g., the types of vehicles that the respective carrier is able to transport); destination (e.g., the cities, states, regions, or distances the respective carrier is willing to travel); or special considerations (e.g., the general availability (e.g., Monday-Friday); the minimum number of vehicles that the carrier will transport from a single shipper).

Figure 9A:
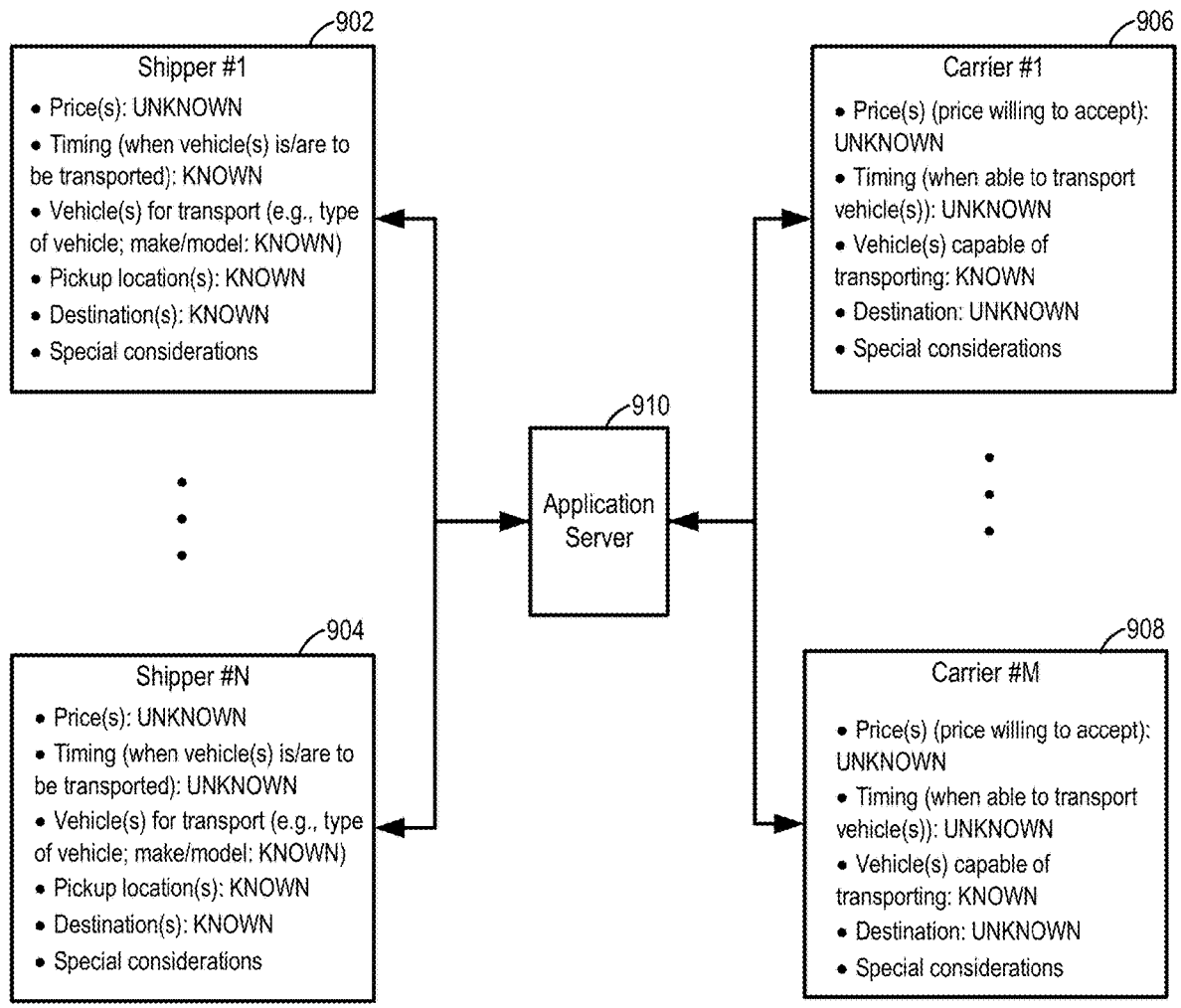
FIGS. 9A-D are example block diagrams of different combinations of available information from the shippers and carriers.
Figure 9B:
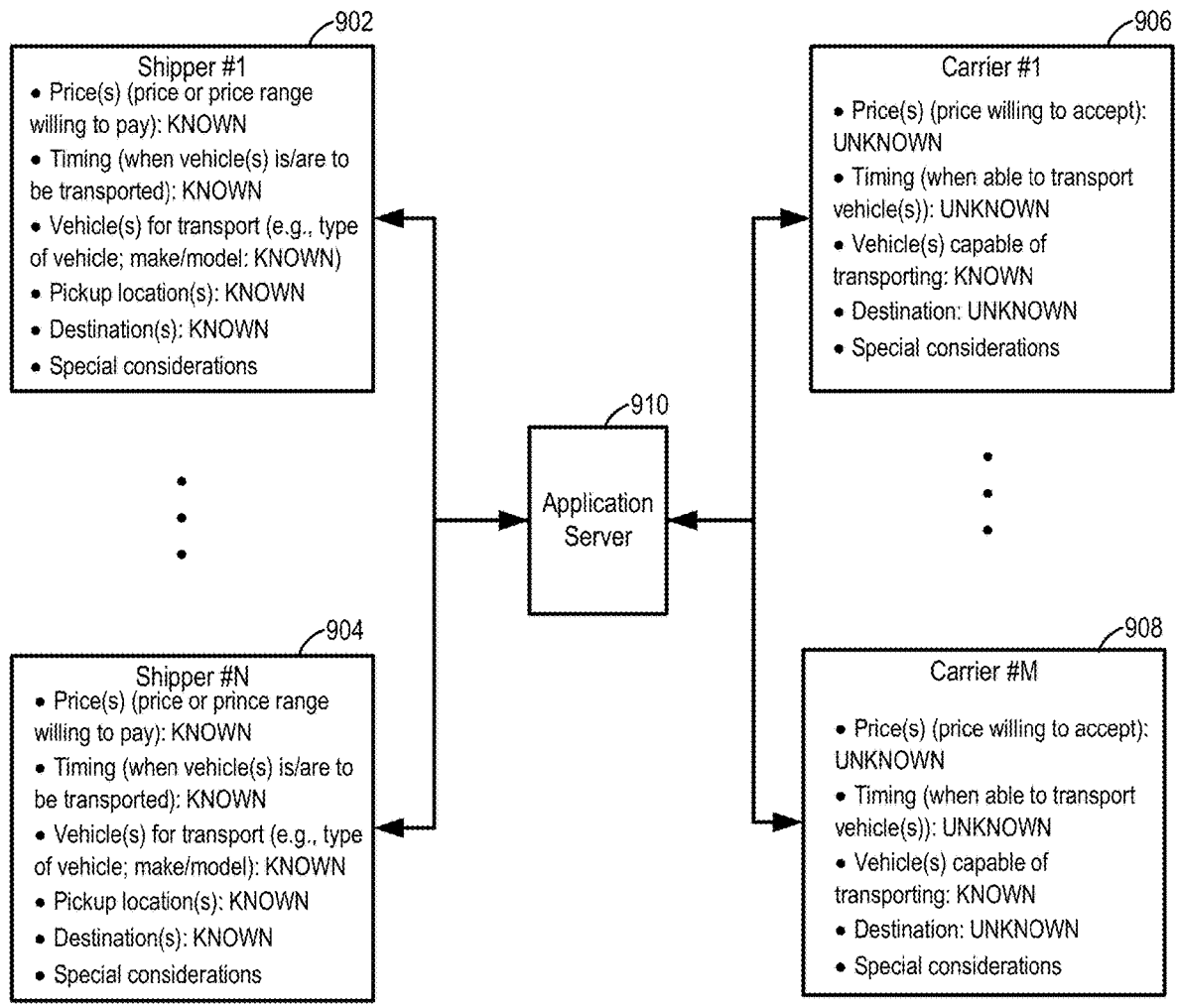
Figure 9C:
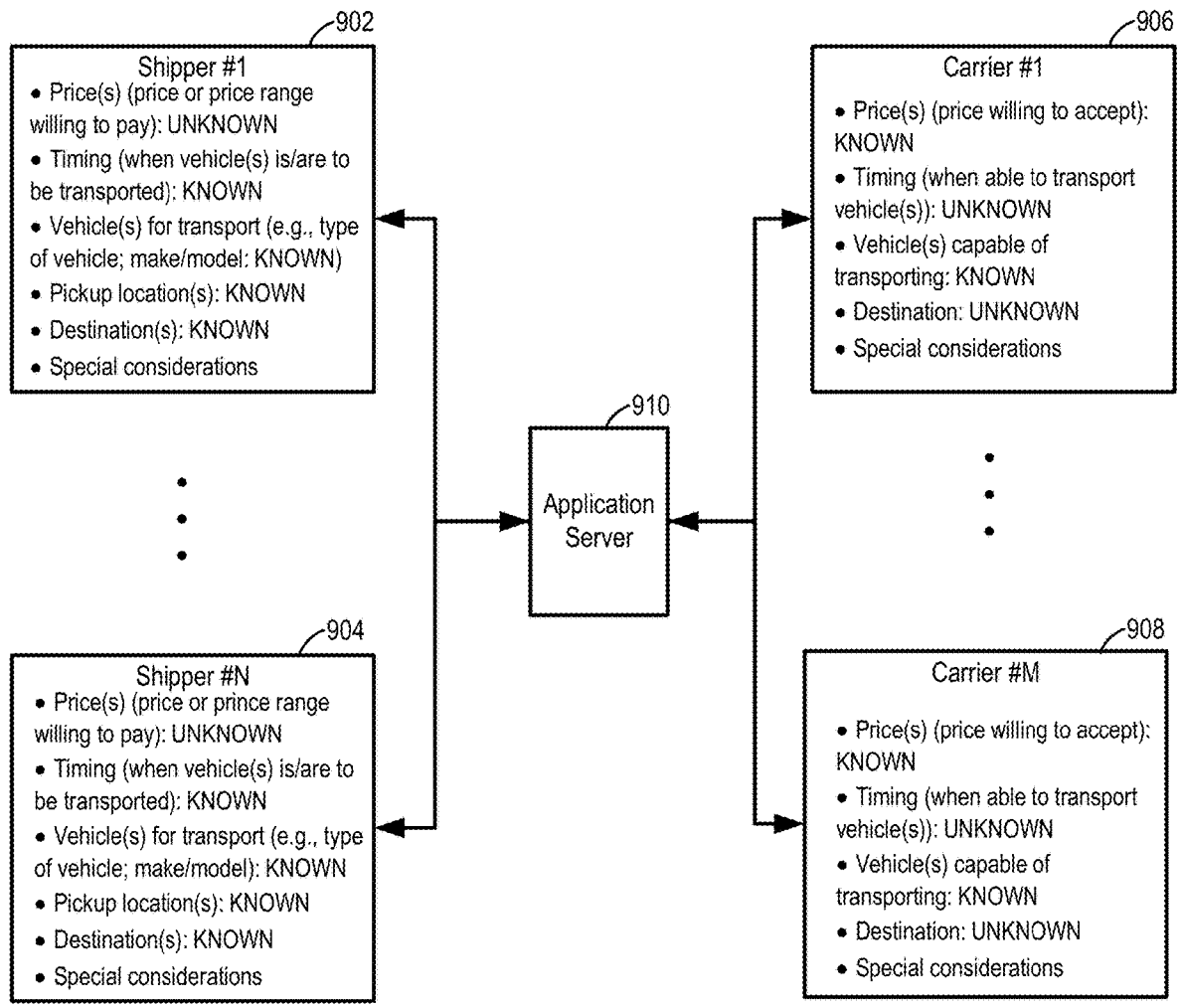
Figure 9D:
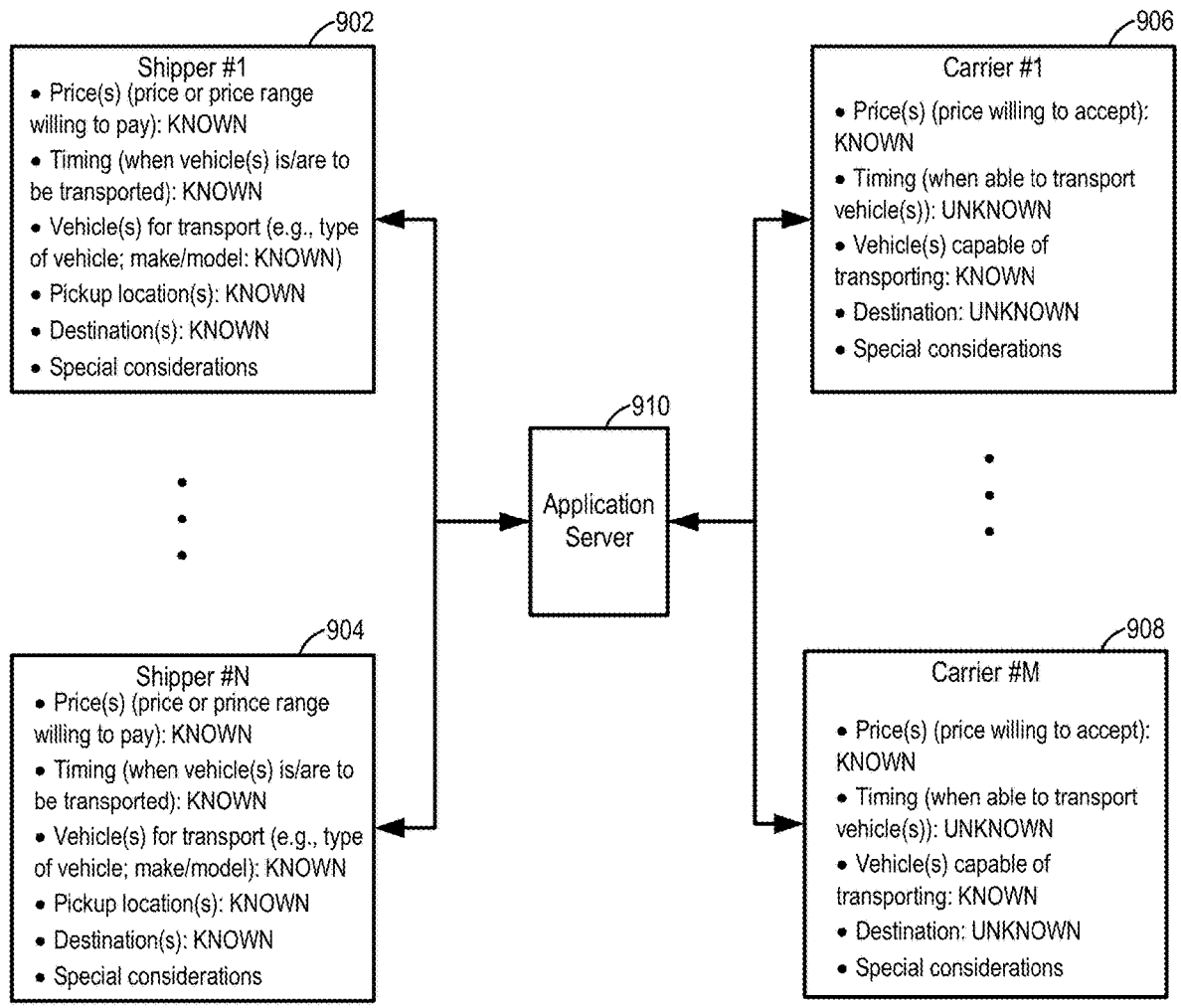

For example, FIG. 9A illustrates the least amount of information available as shown in FIGS. 9A-D. For example, with regard to the shippers, pricing information is unknown, whereas the basics of timing, pickup and destination for the vehicle(s) are known. Likewise, with regard to the carriers, pricing, timing and destination information are unknown, whereas vehicle transporting capability is known. FIG. 9B illustrates the most information known for the shipper, including pricing information, and illustrates the same information known for the carrier as illustrated in FIG. 9A. FIG. 9C illustrates the most information known for the carrier, including pricing information, and illustrates the same information known for the shipper as illustrated in FIG. 9A. FIG. 9D illustrates the most information known for the shipper and the carrier.

Figure 10:
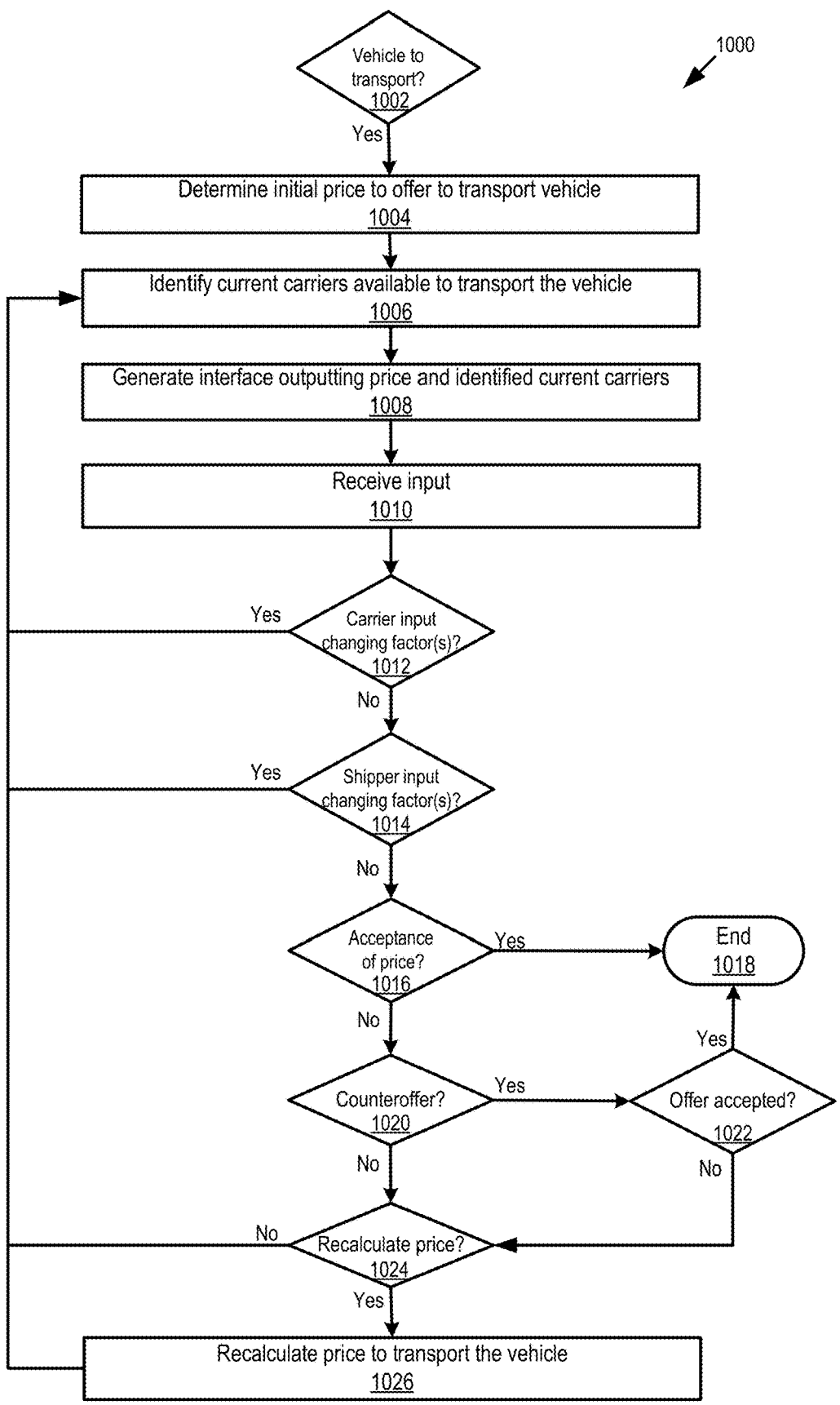
FIG. 10 illustrates an exemplary flow diagram of logic for dynamically updating a user interface.

FIG. 10 illustrates a flow diagram 1000. At 1002, the system, such as application server 910, determines if there is a vehicle to transport. If so, at 1004, the system determines an initial price to offer to transport the vehicle. As discussed above, various methodologies may be used in order to determine the price of transport, including the initial price. As one example, an index pricing model may be used to determine the initial price. In particular, the index pricing model may consider various factors, such as location of the pick-up and/or destination, the routes (such as the highway routes) to ship the vehicle, historical pricing, and the like, as discussed above. The output of the index pricing model may be compared with the available information for the shipper. As one example, to the extent pricing information is available for the shipper, such as illustrated in FIGS. 9B and 9D, the output from the index pricing model may be compared with the pricing information for the shipper. In the event that the output from the index pricing model is a higher price than that which the shipper is willing to pay (according to the pricing information for the shipper), the shipper may be notified (e.g., prior to public posting of the request to carriers to ship) in order to decide whether to set the initial price to offer to transport the vehicle as the output from the index pricing model, to set the initial price at the price as set by the shipper, or to set the initial price to something in between the output from the index pricing model and the price as set by the shipper.

At 1006, the system may identify the current carriers available to transport the vehicle. For example, the system may access a set of all carriers potentially available (e.g., all carriers that have subscribed to ship vehicles). From that set, the system may select a subset based on one, some, or all of the factors including: (1) the capability of the respective carrier (e.g., does the carrier have the capability to transport the vehicle); (2) the location of the carrier with respect to the pickup location (e.g., is the carrier, based on GPS tracking, in the vicinity of the pickup location (e.g., is the distance between the current location of the carrier and the pickup location is less than a predetermined distance); will the carrier, based on an estimate at a future pickup time examining a history associate with the carrier or based on an already-booked work order for the carrier to ship vehicles, be in the vicinity of the pickup location); (3) the location of the carrier with respect to the destination (e.g., will the carrier, based on a history associate with the carrier or based on an already-booked work order for the carrier to ship vehicles, be in the vicinity of the destination); (4) pricing (e.g., is the initial price less than the minimum price that the carrier will accept, either based on explicit input from the carrier, such as illustrated in FIGS. 9C and 9D, or based on implicit input from examining historical pricing accepted by the carrier); (5) special considerations (e.g., the carrier is only willing to accept a shipment where 2 or more vehicles are picked up at the pickup location). Thus, using the various factors, the subset of carriers may be selected.

At 1008, the system generates an interface outputting price and the carriers identified at 1006. Various interfaces are contemplated. As one example, the interface may be similar to that depicted in FIG. 6, in which various shippers and various carriers are displayed on a map. Alternatively, the GUI may display the set of various shippers (situated in the GUI at respective geographic location of the pickup location on the map) and the respective carrier (but no other carriers) at its current location on the map. Still alternatively, the GUI may display a single shipper (situated in the GUI at respective geographic location of the pickup location on the map) and the set of carriers identified at 1006. Further, the representation may be in one of several forms, such as in a standard map form (such as illustrated in FIG. 6) or a heat map representation. As one example, the heat map representation may be based on information regarding the carriers, such as carriers entering a region are designated as "hot" and carriers exiting a region are designated as "cold". Alternatively, or in addition, the heat map representation may be based on information regarding the shipper, whereby values of the number of shippers needing assistance in a respective area, such as in a certain square mile area, may be represented as colors on the heat map representation. Further, the GUI generated may include communication functionality associated with the icons in order for a respective carrier to communicate with the respective shipper and for the respective shipper to communicate with the respective carrier (e.g., a carrier may click or hover over a shipper's icon in order to communicate with the shipper; a shipper may click or hover over a carrier's icon in order to communicate with the carrier, as discussed above).

At 1010, the system receives input from one or both of the shipper or the carrier(s). As one example, the carrier may change one or more of its factors, such as any one, any combination, or all of: the price willing to accept (e.g., lowering the price willing to accept to ship a vehicle or raising the price willing to accept to ship a vehicle); the distance the carrier is willing to travel to the pickup location (e.g., increasing the distance from 100 miles to 200 miles); the distance the carrier is willing to travel to the destination location (e.g., increasing the distance from 100 miles to 200 miles); the number of vehicles required for pickup at the pickup location (e.g., decrease the number of vehicles for pickup from 2 to 1); the timing; etc. Thus, at 1012, the system determines whether the carrier input one or more changing factors. If so, flow diagram 1000 loops back to 1006 and generates an updated interface at 1008 in order to reflect the change in the updated interface for the changed factor(s). As one example, responsive to the carrier decreasing the price willing to accept, the updated interface may show more shippers that have vehicles to ship that meet the decreased price. As another example, responsive to the carrier increasing the distance willing to travel to one or both of the pickup location or the destination location, the updated interface may show more shippers that have vehicles to ship within the expanded geographic area. As yet another example, responsive to decreasing the number of vehicles for pickup at a respective pickup location (e.g., from 2 vehicles to 1 vehicle), the updated interface may show more shippers that have a single vehicle to ship. Conversely, responsive to increasing the number of vehicles for pickup at a respective pickup location (e.g., from 1 vehicle to 2 vehicles), the updated interface may show fewer shippers that have two or more vehicles to ship.

In one implementation, the GUI, in addition to generating the output, may further include one or more input graphical control elements (such as one or more sliders, buttons, pull-downs, scroll bars, etc.) in order for the carrier to input the updated one or more factors. For example, a slider or track bar may correspond to price, with the carrier sliding the slider or track bar to increase or decrease the minimum price the carrier is willing to accept. Responsive to the slider or track bar input, the GUI may be updated, thereby providing real-time (or near real-time) feedback as to the changes based on the input. Alternatively, or in addition, a pull down graphical control element may be used to increase or decrease the number of vehicles for pickup at a respective pickup location. Again, responsive to the input via the pull down graphical control element, the carrier may receive real-time (or near real-time) feedback as to the changes based on the input.

Likewise, the shipper may change one or more of its factors, such as any one, any combination, or all of: the price willing to pay (e.g., increasing the price willing to pay to ship a vehicle); the timing (e.g., expanding the dates when the respective vehicle is to be picked up and/or delivered); the number of vehicles for pickup at the pickup location (e.g., decrease the number of vehicles for pickup from 2 to 1; increase the number of vehicles for pickup from 1 to 2); etc. Thus, at 1014, the system determines whether the shipper input one or more changing factors. If so, flow diagram 1000 loops back to 1006 and generates an updated interface at 1008 in order to reflect the change in the updated interface for the changed factor(s). As one example, responsive to the shipper increasing the price willing to pay, the updated interface may show more carriers that are willing to accept the increased price. As another example, responsive to the shipper expanding the dates when the respective vehicle is to be picked up and/or delivered, the updated interface may show more carriers that meet the expanded timing criteria. As yet another example, responsive to decreasing the number of vehicles for pickup at a respective pickup location (e.g., from 2 vehicles to 1 vehicle), the updated interface may show fewer carriers that are willing to ship a single vehicle. Conversely, responsive to increasing the number of vehicles for pickup at a respective pickup location (e.g., from 1 vehicle to 2 vehicles), the updated interface may show an increased number of carriers that require two or more vehicles to ship. In this way, the interface may be dynamically updated based on input from one or both of the shippers and the carriers in order to better facilitate the agreement to the transaction.

In one implementation, the GUI, in addition to generating the output, may further include one or more input graphical control elements (such as one or more sliders, buttons, pull-downs, scroll bars, etc.) in order for the shipper to input the updated one or more factors. For example, a slider or track bar may correspond to price, with the shipper sliding the slider or track bar to increase or decrease the maximum price the shipper is willing to pay. Responsive to the slider or track bar input, the GUI may be updated, thereby providing real-time (or near real-time) feedback as to the changes based on the input. Alternatively, or in addition, a pull down graphical control element may be used to increase or decrease the number of vehicles for pickup at a respective pickup location. Again, responsive to the input via the pull down graphical control element, the shipper may receive real-time (or near real-time) feedback as to the changes based on the input. In this way, the GUI, in combination with the ability to dynamically modify one or more inputs, may provide feedback in order to facilitate agreement to ship the vehicle.

At 1016, the system determines whether there is acceptance of the price (such as the initial price in the first iteration or the recalculated price in subsequent iterations). If so, at 1018, flow diagram 1000 ends. If not, the system determines at 1020 whether a counteroffer has been presented. As discussed above, one or both of the shipper or the carrier may input alternate offers, such as counteroffers. If so, at 1022, the system determines whether the counteroffer has been accepted. If so, at 1018, the flow diagram 1000 ends.

Absent any acceptance of the price (or acceptance of a counteroffer), at 1024, the system determines whether to recalculate the price. If so, at 1026, the system recalculates the price to transport the vehicle. The determination as to whether to recalculate the price may be based on one or more factors including any one, any combination, or all of: (1) timing (e.g., how long until the time when the vehicle is to be picked up: the shorter the time until pickup, the higher the increase in the price); (2) a number of carriers that meet the criteria; (3) history of pricing. After which, flow diagram 1000 loops back to 1006.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

What is claimed is:

1. A system, comprising:
    at least one database configured to store carrier information for a plurality of respective carriers and shipper information for a plurality of respective shippers, the carrier information indicative of at least one carrier criterion for each of the plurality of respective carriers and the shipper information indicative of at least one shipper criterion for each of the plurality of respective shippers;

at least one communication interface configured to receive a request for one or both of a respective carrier or a respective shipper; and at least one processor in communication with the at least one database and the at least one communication interface and configured to:

receive, through the at least one communication interface, the request from the one or both of the respective carrier or the respective shipper for agreement to transport;

responsive to the request from the respective carrier:
access a respective location for the respective carrier;
select, based on the at least one carrier criterion for the respective carrier, the at least one shipper criterion for the plurality of respective shippers and the respective location for the respective carrier, a subset of the plurality of respective shippers each of which has a respective location;
generate a carrier graphical user interface (GUI) based on the subset of the plurality of respective shippers, the carrier GUI comprising a map view and including respective icons positioned on the map view to correspond to the respective location of one or more in the subset of the plurality of respective shippers and the respective location of the respective carrier, and including shipper additional information output in response to at least one user interaction with the respective icon; and
send the carrier GUI to the respective carrier;

responsive to the request from the respective shipper:
determine respective locations for one or more of the plurality of respective carriers;
select, based on the at least one carrier criterion for the plurality of the respective carriers, the at least one shipper criterion for the respective shipper and the respective locations for the one or more of the plurality of respective carriers, a subset of the plurality of respective carriers;
generate a shipper GUI based on the subset of the plurality of respective carriers, the shipper GUI comprising the map view and including one or more respective icons positioned on the map view to correspond to one or more of the respective locations of at least some of the subset of the plurality of respective carriers and a respective location of the respective shipper, and including carrier additional information output in response to the at least one user interaction with the one or more respective icons; and
send the shipper GUI to the respective shipper; and wherein at least one of:
responsive to the at least one user interaction with a respective icon on the map view of the carrier GUI, a communication window is launched on a same screen as the carrier GUI is presented enabling communication input by the respective carrier to the respective shipper assigned to the respective icon on the carrier GUI in order for the respective carrier to negotiate the agreement to transport; and
the at least one processor is configured to route the communication to the respective shipper assigned to the respective icon on the carrier GUI;
or;
responsive to the at least one user interaction with a respective icon on the map view of the shipper GUI, the communication window is launched on a same screen as the shipper GUI is presented enabling communication input by the respective shipper to the respective carrier assigned to the respective icon on the shipper GUI in order for the respective shipper to negotiate the agreement to transport; and
the at least one processor is configured to route the communication to the respective carrier assigned to the respective icon on the shipper GUI.

2. The system of claim 1, wherein at least one user interaction comprises user selection; and
wherein the user selection of the respective icon comprises clicking on or hovering over the respective icon.

3. The system of claim 2, wherein the plurality of respective shippers comprise vehicle dealers and the plurality of respective carriers comprise vehicle carriers;
wherein the carrier additional information comprises one or both of carrier heading information or amount of available carrier capacity; and
wherein responsive to the user selection of the respective icon, the shipper GUI is configured to output an overlay and including the one or both of the carrier heading information or the amount of available carrier capacity.

4. The system of claim 3, wherein the at least one carrier criterion comprises a capability of shipping a type of vehicle and a number of vehicles;
wherein the request from the respective shipper includes a number of vehicles for shipping and the type of vehicles for shipping; and
wherein the at least one processor is configured to select the subset of the plurality of respective carriers based on comparing the number of vehicles for shipping against the capability of the respective carrier and comparing the type of vehicles for shipping with the capability of the respective carrier.

5. The system of claim 3, wherein the at least one shipper criterion comprises a payment price for shipping;
wherein the request from the respective carrier includes a minimum price for shipping; and
wherein the at least one processor is configured to select the subset of the plurality of respective shippers based on comparing the minimum price for shipping against the payment price for shipping for each of the plurality of respective shippers.

6. The system of claim 1, wherein the carrier GUI generated by the at least one processor is further configured to enable communication functionality for the respective carrier with the subset of the plurality of respective shippers via the respective icons associated with locations of the subset of the plurality of respective shippers; and
wherein the shipper GUI generated by the at least one processor is further configured to enable communication functionality for the respective shipper with the subset of the plurality of respective carriers via the respective icons associated with locations of the subset of the plurality of respective shippers.

7. The system of claim 6, wherein a status of a respective shipper is associated with the respective icon for the respective shipper, the status for the respective shipper comprises an indication of a vehicle for shipping and a payment for shipping; and wherein a status of a respective carrier is associated with the respective icon for the respective carrier, the status for the respective carrier comprises an indication of availability of the respective carrier and a heading for the respective carrier.

8. The system of claim 1, wherein the respective location for the respective carrier comprises a mobile location transmitted from a mobile electronic device for the respective carrier.

9. The system of claim 8, wherein the at least one processor is further configured to determine, based on the respective location for the respective carrier, a distance between the respective carrier and the respective shipper; and wherein the at least one processor is configured to select the subset of the plurality of respective carriers that have the distance between the respective carrier and the respective shipper to be less than or equal to a predetermined amount.

10. The system of claim 1, wherein the communication window enabling the communication input by the respective carrier to the respective shipper assigned to the respective icon comprises a communication popup window configured to enable the communication by the respective carrier to the respective shipper; and wherein the communication window enabling the communication input by the respective shipper to the respective carrier assigned to the respective icon comprises a communication popup window configured to enable the communication by the respective shipper to the respective carrier.

11. The system of claim 1, wherein the communication window includes textual communications between the respective shipper and the respective carrier.

12. The system of claim 11, wherein the communication window comprises a history of one or more communications between the respective carrier and the respective shipper.

13. The system of claim 1, wherein the at least one processor is further configured to:
monitor a respective location of at least one carrier; and
trigger, based on the respective locations of the respective shipper and the at least one carrier, the carrier GUI to indicate an icon associated with the at least one carrier.

14. The system of claim 13, wherein the at least one processor is further configured to:
trigger, based on the respective locations of the respective shipper and the at least one carrier, a communication indicative to the at least one carrier that the at least one carrier is within a predetermined distance from a pick-up location of the respective shipper.

15. The system of claim 1, wherein the at least one processor is further configured to:
receive input from the respective carrier indicative of a distance the respective carrier is willing to travel to pick-up a vehicle at a pickup location; and
select the subset of a plurality of shippers to be within the distance the respective carrier is willing to travel to pick-up the vehicle at the pickup location; and
wherein the at least one processor is configured to generate the carrier GUI to indicate the subset of the plurality of shippers that are within the distance the respective carrier is willing to travel to pick-up the vehicle at the pickup location.

16. A system comprising:
at least one database configured to store at least one of carrier information for a plurality of respective carriers or shipper information for a plurality of respective shippers, the carrier information indicative of at least one carrier criterion for each of the plurality of respective carriers and the shipper information indicative of at least one shipper criterion for each of the plurality of respective shippers;
at least one communication interface configured to receive a request for one or both of a respective carrier or a respective shipper; and
at least one processor in communication with the at least one database and the at least one communication interface and configured to:
receive, through the at least one communication interface, the request from the one or both of the respective carrier or the respective shipper;
responsive to the request from the respective carrier:
access a respective location for the respective carrier;
select, based on the at least one carrier criterion for the respective carrier, the at least one shipper criterion for the plurality of respective shippers and the respective location for the respective carrier, a subset of the plurality of respective shippers each of which has a respective location;
generate a carrier graphical user interface (GUI) based on the subset of the plurality of respective shippers, the carrier GUI comprising a map view and including respective icons positioned on the map view to correspond to the respective location of one or more in the subset of the plurality of respective shippers and the respective location of the respective carrier, and including shipper additional information output in response to at least one user interaction with the respective icon; and
send the carrier GUI to the respective carrier;
or
responsive to the request from the respective shipper:
determine respective locations for one or more of the plurality of respective carriers;
select, based on the at least one carrier criterion for the plurality of the respective carriers, the at least one shipper criterion for the respective shipper and the respective locations for the one or more of the plurality of respective carriers, a subset of the plurality of respective carriers;
generate a shipper GUI based on the subset of the plurality of respective carriers, the shipper GUI comprising the map view and including one or more respective icons positioned on the map view to correspond to one or more of the respective locations of at least some of the subset of the plurality of respective carriers and a respective location of the respective shipper, and including carrier additional information output in response to the at least one user interaction with the one or more respective icons; and
send the shipper GUI to the respective shipper; and
wherein at least one of:
responsive to the at least one user interaction with a respective icon on the map view of the carrier GUI, a communication window is launched on a same screen as the carrier GUI is presented enabling communication input by the respective carrier to the respective shipper assigned to the respective icon on the carrier GUI in order for the respective carrier to negotiate an agreement to transport; and
the at least one processor is configured to route the communication to the respective shipper assigned to the respective icon on the carrier GUI;

or;
   responsive to the at least one user interaction with a respective icon on the map view of the shipper GUI, the communication window is launched on a same screen as the shipper GUI is presented enabling communication input by the respective shipper to the respective carrier assigned to the respective icon on the shipper GUI in order for the respective shipper to negotiate the agreement to transport; and
   the at least one processor is configured to route the communication to the respective carrier assigned to the respective icon on the shipper GUI.

17. A method comprising:
receiving a request for one or both of a respective carrier or a respective shipper, the request for one or both of the respective carrier or the respective shipper;
responsive to the request from the respective carrier:
   accessing a respective location for the respective carrier;
   accessing at least one database, the at least one database storing carrier information for a plurality of respective carriers and shipper information for a plurality of respective shippers, the carrier information indicative of at least one carrier criterion for each of the plurality of respective carriers and the shipper information indicative of at least one shipper criterion for each of the plurality of respective shippers;
   selecting, based on the at least one carrier criterion for the respective carrier, the at least one shipper criterion for the plurality of respective shippers and the respective location for the respective carrier, a subset of the plurality of respective shippers each of which has a respective location;
   generating a carrier graphical user interface (GUI) based on the subset of the plurality of respective shippers, the carrier GUI comprising a map view and including respective icons positioned on the map view to correspond to the respective location of one or more in the subset of the plurality of respective shippers and the respective location of the respective carrier, and including shipper additional information output in response to at least one user interaction with the respective icon; and
   sending the carrier GUI to the respective carrier;
responsive to the request from the respective shipper:
   determining respective locations for one or more of the plurality of respective carriers;
   selecting, based on the at least one carrier criterion for the plurality of the respective carriers, the at least one shipper criterion for the respective shipper and the respective locations for the one or more of the plurality of respective carriers, a subset of the plurality of respective carriers;
   generating a shipper GUI based on the subset of the plurality of respective carriers, the shipper GUI comprising the map view and including one or more respective icons positioned on the map view to correspond to one or more of the respective locations of at least some of the subset of the plurality of respective carriers and a respective location of the respective shipper, and including carrier additional carrier information output in response to the at least one user interaction with the one or more respective icons; and
   sending the shipper GUI to the respective shipper; and
wherein at least one of the following is performed:
   responsive to the at least one user interaction with a respective icon on the map view of the carrier GUI, launching a communication window on a same screen as the carrier GUI is presented enabling communication input by the respective carrier to a respective shipper assigned to the respective icon on the carrier GUI in order for the respective carrier to negotiate an agreement to transport; and
   routing the communication to the respective shipper assigned to the respective icon on the carrier GUI; or;
   responsive to the at least one user interaction with a respective icon on the map view of the shipper GUI, launching a communication window on a same screen as the shipper GUI is presented enabling communication input by the respective shipper to the respective carrier assigned to the respective icon on the shipper GUI in order for the respective shipper to negotiate the agreement to transport; and
   routing the communication to the respective carrier assigned to the respective icon on the shipper GUI.

18. The method of claim 17, further comprising:
monitoring a respective location of at least one carrier; and
triggering, based on the respective locations of the respective shipper and the at least one carrier, a communication indicative to the at least one carrier that the at least one carrier is within a predetermined distance from a pick-up location of the respective shipper.

19. The method of claim 17, further comprising:
receiving input from the respective carrier indicative of a distance the respective carrier is willing to travel to pick-up a vehicle at a pickup location; and
selecting the subset of a plurality of shippers to be within the distance the respective carrier is willing to travel to pick-up the vehicle at the pickup location; and
wherein the carrier GUI is generated to indicate the subset of the plurality of shippers that are within the distance the respective carrier is willing to travel to pick-up the vehicle at the pickup location.

20. The method of claim 17, wherein determining the respective locations for the one or more of the plurality of respective carriers comprises receiving transmissions from mobile electronic devices for the one or more of the plurality of respective carriers.

* * * * *